US008190576B2

(12) United States Patent
Yamaguchi et al.

(10) Patent No.: US 8,190,576 B2
(45) Date of Patent: May 29, 2012

(54) FILE RECORDING DEVICE AND IMAGING DEVICE

(75) Inventors: Takehito Yamaguchi, Osaka (JP); Kenji Maeda, Osaka (JP); Shigeo Sakaue, Osaka (JP)

(73) Assignee: Panasonic Corporation, Osaka (JP)

( * ) Notice: Subject to any disclaimer, the term of this patent is extended or adjusted under 35 U.S.C. 154(b) by 634 days.

(21) Appl. No.: 12/092,702

(22) PCT Filed: Oct. 26, 2006

(86) PCT No.: PCT/JP2006/321398
§ 371 (c)(1),
(2), (4) Date: May 5, 2008

(87) PCT Pub. No.: WO2007/052531
PCT Pub. Date: May 10, 2007

(65) Prior Publication Data
US 2009/0119350 A1 May 7, 2009

(30) Foreign Application Priority Data
Nov. 4, 2005 (JP) .................................. 2005-320400

(51) Int. Cl.
*G06F 17/30* (2006.01)
(52) U.S. Cl. ........ 707/653; 707/638; 707/758; 707/824; 348/231.9
(58) Field of Classification Search .......................... None
See application file for complete search history.

(56) References Cited

U.S. PATENT DOCUMENTS

| 6,065,018 | A | * | 5/2000 | Beier et al. .................... 707/610 |
| 6,453,325 | B1 | * | 9/2002 | Cabrera et al. ........................ 1/1 |
| 6,625,334 | B1 | * | 9/2003 | Shiota et al. .................. 382/305 |
| 7,120,769 | B2 | * | 10/2006 | Yagawa et al. ................ 711/162 |
| 7,266,574 | B1 | * | 9/2007 | Boudrie et al. ............... 707/646 |
| 7,508,425 | B2 | * | 3/2009 | Belz et al. .................. 348/231.2 |
| 2002/0032909 | A1 | * | 3/2002 | Shiota et al. .................... 725/91 |
| 2005/0151858 | A1 | * | 7/2005 | Nozaki et al. .............. 348/231.9 |
| 2006/0026218 | A1 | * | 2/2006 | Urmston ....................... 707/204 |

(Continued)

FOREIGN PATENT DOCUMENTS
JP 58-51392 3/1983
(Continued)

OTHER PUBLICATIONS
International Search Report issued Nov. 21, 2006 in International (PCT) Application No. PCT/JP2006/321398.

*Primary Examiner* — Debbie Le
(74) *Attorney, Agent, or Firm* — Wenderoth, Lind & Ponack, L.L.P.

(57) ABSTRACT

A file recording device includes a control unit (101) that controls a batch copy process which copies collectively a plurality of files stored in a first recording medium (300) from the first recording medium (300) to a second recording medium (106). When a batch copy process is completed, the control unit (101) records copy date and time identification information for identifying copy completion date and time to the first recording medium. The control unit (101) performs the control so as to compare the batch copy completion date and time indicated by the copy date and time identification information with recording date and time information on files stored in the first recording medium, to identify a file recorded in the first recording medium (300) later than the date and time on which the batch copy is performed, and then to copy the identified file to the second recording medium (106).

12 Claims, 27 Drawing Sheets

U.S. PATENT DOCUMENTS

| | | | |
|---|---|---|---|
| 2007/0065119 A1* | 3/2007 | Pomerantz | 386/125 |
| 2007/0112895 A1* | 5/2007 | Ahrens et al. | 707/204 |
| 2008/0022416 A1* | 1/2008 | Yamauchi et al. | 726/31 |
| 2008/0211927 A1* | 9/2008 | Nozaki et al. | 348/231.7 |

FOREIGN PATENT DOCUMENTS

| | | |
|---|---|---|
| JP | 4-324565 | 11/1992 |
| JP | 9-198283 | 7/1997 |
| JP | 2000-152209 | 5/2000 |
| JP | 2001-69296 | 3/2001 |
| JP | 2002-203231 | 7/2002 |
| JP | 2004-297158 | 10/2004 |
| JP | 2004-341630 | 12/2004 |
| JP | 2005-189969 | 7/2005 |

* cited by examiner

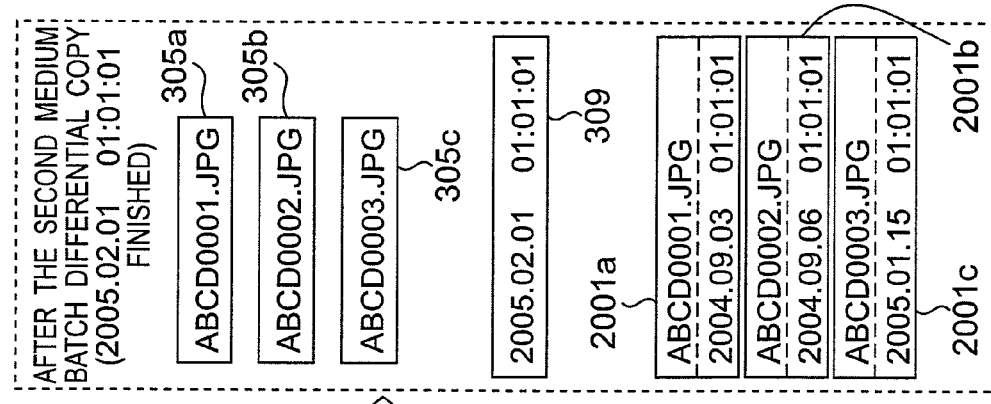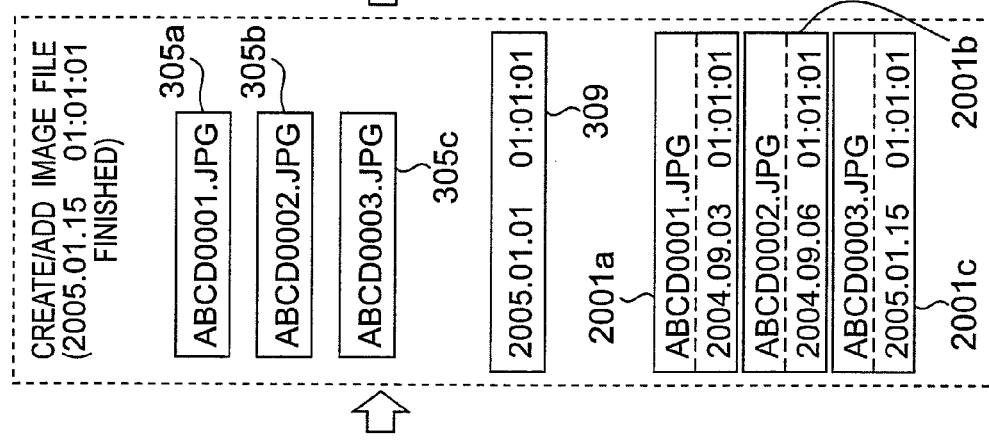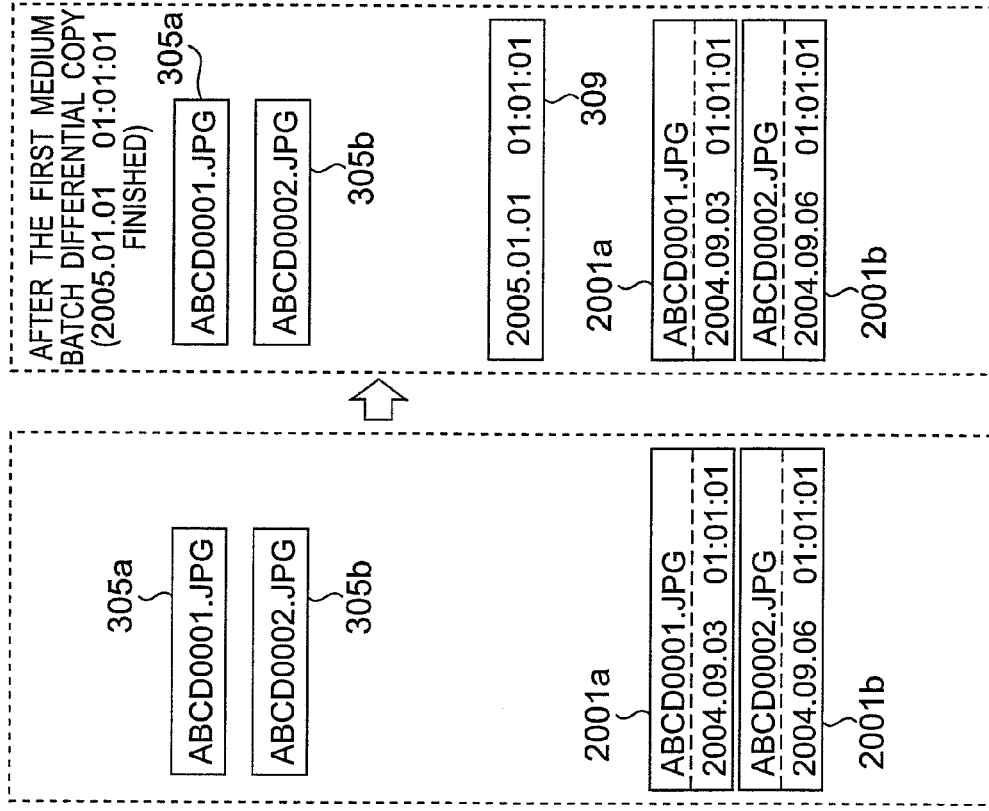

FILE RECORDING DEVICE AND IMAGING DEVICE

TECHNICAL FIELD

The present invention relates to a file recording device that copies files between recording media, for example, to a file recording device that performs a batch copy of a plurality of image files from a primary recording medium, such as a memory card, that stores image files taken with a digital camera to a secondary recording medium, such as a magnetic disk, built in the device. Furthermore, the present invention relates to an imaging device that records an image file in a recording medium.

BACKGROUND ART

Generally widespread digital cameras employs, as a recording medium for images taken, a memory built in the cameras or a memory card removable from the cameras. Various types of memory cards are released and available.

Meanwhile, for a recording and playback device, such as a DVD recorder, that records and plays back a broadcast program, a model has been introduced that has a card slot for loading a memory card and has functions of copying image files (including still image files and moving image files) stored in the memory card to a mass recording medium (for example, hard disk drive) in the device and storing the image files, playing back the stored image files, and displaying the image files on a screen of a television set connected to the recording and playback device with a video signal cable.

The introduction of the above-described recording and playback device allows a user to easily play back and display the image files on a big screen of a television set and enjoy it, as long as the files shot with a digital camera are stored in the recording and playback device.

In copying image files to the mass recording medium in the above-described recording and playback device, it is generally done by a user to provide a preview of image files which are copy targets on a television screen, and select an image file(s) after confirming images.

However, a selection operation by a preview display is performed by a remote control operation of the recording and playback device, and thus the selection operation is a quite burdensome operation for the user, which is in turn a cause of preventing easy operation for copy to the recording and playback device.

As a copy scheme for solving such a problem, a method of copying all image files in a memory card to a mass recording medium of a recording and playback device has been introduced (hereinafter, referred to as the "medium batch copy scheme").

In the medium batch copy scheme, since the user does not need to select an image file(s), a copy can be easily performed to the mass recording medium of the recording and playback device. However, the batch copy scheme has the following problem.

Specifically, after copying still image files or moving image files recorded in the memory card to the mass recording medium of the recording and playback device, if a batch copy is performed again with the still image files and moving image files that have been copied remaining without being deleted from the memory card, then the still image files or the moving image files that have already been copied are copied again and thus such still image files or moving image files are stored in the mass recording medium redundantly.

Here, with an increase in the storage capacity of the memory card, the case in which image files remain in the memory card without being deleted therefrom is increasing. Accordingly, in the batch copy scheme, the number of image files to be stored redundantly is increasing. The occurrence of duplicative storage not only wastefully squeezes the storage capacity of the mass recording medium of the recording and playback device but also causes a plurality of the same files to be present on the same mass recording medium, which becomes a big cause of a reduction in file search efficiency upon playback.

Conventionally, in order to circumvent such inconveniences, various techniques have been proposed. For example, in Patent Document 1, a memory card that is used for receiving/sending image files from/to a digital camera is assigned a unique medium ID code which is assigned to each memory card and different in each memory card, and the unique medium ID code together with a time stamp and a data size are written in an image file as identification information. Then, upon copy to the mass recording medium of the recording and playback device, identity between image files on the recording and playback device and image files in the memory card is judged using the identification information, and then it is judged whether the image files have been copied. For copied files, a copy is skipped, and duplicative storage is prevented.

A copy as described above which is a batch copy of only image files that have not been copied yet after determining whether image files have already been copied to a copy destination device is hereinafter referred to as a "differential copy".

In the above-described conventional case, before copying image files stored in the memory card, identity check is made for all image files between the mass recording medium of the recording and playback device and the memory card to determine whether the image files have not been copied yet. And only image files that are determined to have not been copied yet are copied to and stored on the mass recording medium, and thus duplicative storage can be prevented. In addition, since a unique medium ID which is uniquely assigned to each memory card is used in the identity check, erroneously-determining and duplicative storage can be prevented even in the case that a plurality of memory cards are used.

Patent Document 1: JP-A-2004-341630

DISCLOSURE OF INVENTION

Problems to be Solved by the Invention

In the Patent Document 1, a determination as to whether "image files stored in a memory card" have not been copied is made by an identity check with "all image files stored on a mass recording medium, such as a hard disk drive, of a recording and playback device".

Since the identity check is performed for each of the "image files stored in a memory card", the number of times of identity checks is maximum when there are no identical image files and the maximum number of times of the checks is determined by the product of the "number of image files stored in a memory card" and the "number of image files stored on the hard disk drive". For example, when the number of image files stored in the memory card is 100 and the number of image files stored on the mass recording medium is 2000, the number of times of identity checks is 200,000 (=100×200) at a maximum. That is, the larger the number of image files stored on the mass recording medium, the larger the number of times of identity checks, causing a problem that it takes time to make a determination.

In recent years, both memory cards and hard disk drives of recording and playback devices have been increased in their capacity and accordingly the number of image files that can be stored in a recording medium has also been increased. In a recording and playback device that does not have sufficient system resources as compared with a personal computer, and so on, due to an increase in the number of image files to be stored in a recording medium, the uncopy determination by the identity check process requires a considerable amount of time.

Moreover, in Patent Document 1, a unique medium ID needs to be written in advance in a non-rewritable area of a memory card used for a differential copy. Hence, not only the recording and playback device to which image files are copied but also a device (e.g., a digital camera) which records image files first to a memory card needs to be equipped with a function of writing the unique medium ID.

The present invention is directed to solve the above-described problems and has an object to provide a file recording device capable of easily and quickly performing a batch copy of image files from one recording medium to another recording medium.

Means for Solving the Problems

A file recording device according to the present invention includes a medium access unit adapted to load a removable first recording medium, a second recording medium that stores a file, and a control unit that controls a batch copy process which copies collectively a plurality of files stored in the first recording medium from the first recording medium to the second recording medium. The first recording medium stores, for each file, recording date and time information for identifying recording date and time of the file. When the batch copy process from the first recording medium to the second recording medium is completed, the control unit records copy date and time identification information for identifying completion date and time of the batch copy process to the first recording medium. The control unit further controls the batch copy process so as to compare the completion date and time of the batch copy process indicated by the copy date and time identification information with recording date and time information on files to be stored in the first recording medium, to identify a file which is recorded in the first recording medium later than the date and time on which the batch copy is performed, and to copy the identified file from the first recording medium to the second recording medium.

The control unit may control the batch copy process so as to copy all files stored in the first recording medium from the first recording medium to the second recording medium, when the copy date and time identification information is not recorded in the first recording medium.

When the first recording medium can be accessed from a plurality of file recording devices, the control unit may record the copy date and time identification information to the first recording medium, while relating the copy date and time identification information to a file recording device including the control unit. The control unit may identify copy date and time identification information related to the file recording device, with information unique to the file recording device including the control unit, and control the batch copy process from the first recording medium to the second recording medium based on the identified copy date and time identification information.

The information unique to a file recording device may be a manufacturing number of the file recording device. When the file recording device includes a communication unit that is assigned a unique code which is unique on a network is assigned, the information unique to a file recording device may be the unique code assigned to the communication unit or a code derived from the unique code.

The control unit may treat all files stored in the first recording medium, as target for copy from the first recording medium to the second recording medium. Alternatively, the control unit may treat only files stored in a folder designated by a user, as target for copy from the first recording medium to the second recording medium. Alternatively, the control unit may treat only files that satisfy a condition designated by a user, as target for copy from the first recording medium to the second recording medium.

Further when the first recording medium further stores a plurality of pieces of the recording date and time information for each file, the control unit may compare the completion date and time of the batch copy process indicated by the copy date and time identification information, with a latest one among dates and times indicated by the plurality of pieces of the recording date and time information.

The control unit may record, as the copy date and time identification information, the latest date and time among dates and times indicated by recording date and time information on all files copied from the first recording medium to the second recording medium, to the first recording medium.

The recording date and time information and the copy date and time identification information may include information by which chronological relationship between date and time on which a file in the first recording medium is recorded to the first recording medium and date and time on which the batch copy is completed can be identified.

An imaging device according to the present invention is an imaging device for recording an image file to a removable first recording medium, and includes a controller that controls an operation of the imaging device. The first recording medium stores recording date and time information indicating recording date and time of a stored file for each file, and copy date and time identification information for identifying date and time on which a batch copy of a file(s) from the first recording medium to a second recording medium is completed. The controller performs control so as to compare, in the first recording medium, date and time indicated by the copy date and time identification information with recording date and time information on a file in the first recording medium, to determine whether the file is copied to the second recording medium, and to store information indicating a result of the determination to a predetermined storage area.

Effects of the Invention

The file recording device according to the present invention records copy date and time identification information which indicates completion date and time of a batch copy from the first recording medium to the second recording medium, to the first recording medium. By referring to the copy date and time identification information, it does not need to match the files stored in the first recording medium with the files stored in the second recording medium one by one as in the conventional method in order to determine whether a copy to the second recording medium is done. By comparing the copy date and time identification information with the recording date and time information on files, files that has not been copied to the second recording medium can be easily and quickly identified, achieving speed-up of a process in the differential batch copy. Particularly, such speed-up of a process in the differential batch copy, as obtained in the present invention, is effective to a file recording device such as a DVD recorder, since the throughput of the file recording device for file management is not so high.

In addition, imaging device according to the present invention determines whether the files stored in the first recording medium have been already backed up by referring to the copy date and time identification information stored in the first recording medium, and then stores information on the determination. By referring to the information, it is possible to display information about whether backup has been made on playback of images and to speed up the process of deletion of backed-up image files.

BRIEF DESCRIPTION OF DRAWINGS

FIGS. 10A to 10D are diagrams showing a transition state of the batch differential copy management file and directory items in the recording medium, along with the medium batch differential copy process.

DESCRIPTION OF REFERENCE NUMERALS

50: FILE INPUT DEVICE
100, 120, 130, and 140: FILE RECORDING DEVICE
106: FILE STORAGE UNIT
122: DEVICE ID
132: MAC ADDRESS
300: RECORDING MEDIUM
305a: IMAGE FILE
309: MEDIUM BATCH COPY MANAGEMENT FILE
343: FOLDER BATCH COPY MANAGEMENT FILE
2001: DIRECTORY ITEM

BEST MODE FOR CARRYING OUT THE INVENTION

Embodiments of the present invention will be described below with reference to the drawings.

First Embodiment

<System Configuration>

Figure 1:
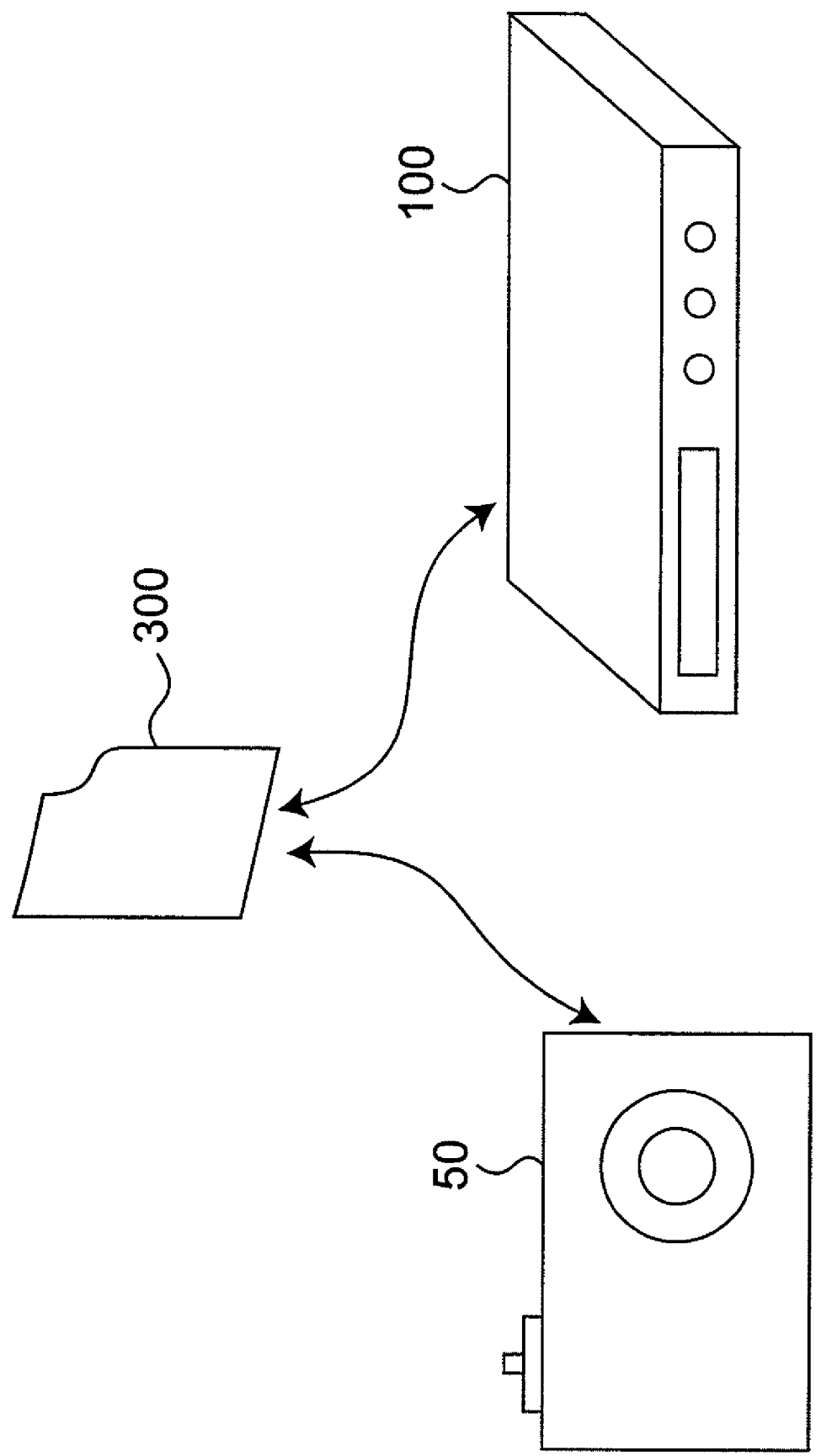
FIG. 1 is a diagram showing a configuration of a system including a file input device and a file recording device, according to the present invention.

FIG. 1 shows a configuration of a system including a file input device and a file recording device, according to the present invention.

The system includes a file input device 50, a recording medium 300, and a file recording device 100. The file input device 50 is, for example, a digital camera 50. The recording medium 300 is a recording medium that can be inserted to and removed from the file input device 50, and is a memory card such as an SD card or a flash memory (registered trademark), for example. The file recording device 100 is a device including a built-in recording medium and having a function of allowing the recording medium 300 to be placed therein to copy data stored in the recording medium 300 to the built-in recording medium. The file recording device 100 is, for example, a DVD recorder having an SD memory card slot and a built-in hard disk.

The file input device 50 records image files to the recording medium 300. Thereafter, when the recording medium 300 is inserted into the file recording device 100, the image files stored in the recording medium 300 are collectively copied to the recording medium included in the file recording device 100.

Particularly, in the present embodiment, when files have been collectively copied (medium batch copy) from the recording medium 300 to the file recording device 100, information indicating completion date and time of the copy is stored in the recording medium 300. Thereafter, when files are collectively copied from the recording medium 300 to the file recording device 100, the information indicating batch copy completion date and time which is stored in the recording medium 300 is compared with time stamp information (creation date and time or update date and time) on the files which are copy targets to determine whether the copy target files have already been recorded on the file recording device 100.

In the above-described determination, it is determined that a file with a time stamp which is newer than the medium batch copy completion date and time has not been copied to the file recording device 100 yet. The above-described determination condition is established under a condition where the file input device 50 that writes a file to the recording medium 300 which is a copy source only performs file creation and file deletion. A representative example of such a file input device 100 is a digital camera. A general digital camera has functions of storing taken image files in the removable recording medium 300 such as an SD memory card, and deleting the image file stored in the recording medium 300, which is determined to be unnecessary by a user. However general digital camera does not have a function of copying image files between recording media. Therefore the above-described condition is true.

<File Input Device>

Figure 2:
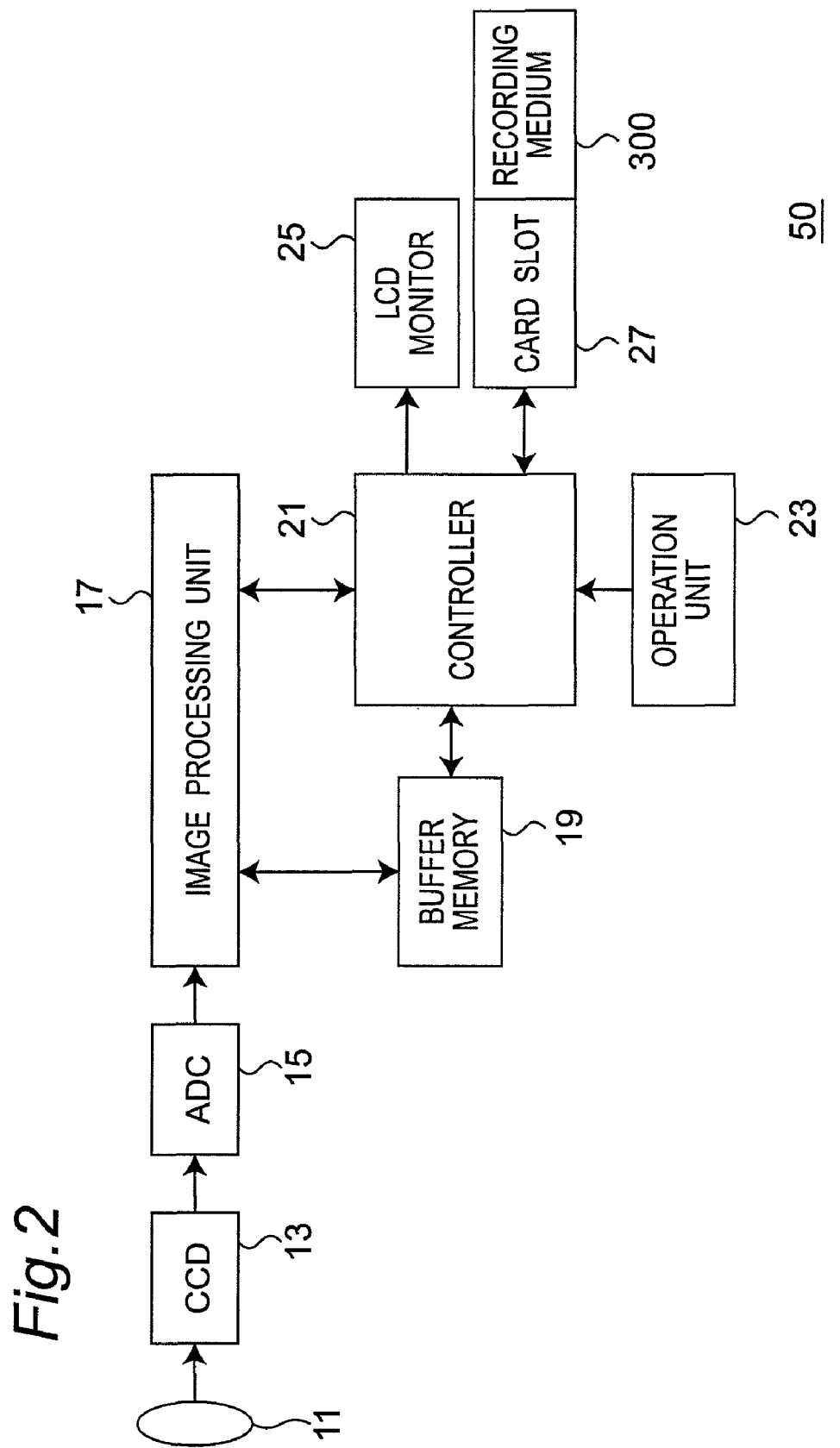
FIG. 2 is a diagram showing a configuration of the file input device.

FIG. 2 shows an exemplary configuration of the file input device 50 which is a digital camera. The file input device 50 includes a lens 11, a CCD 13 that converts optical information into an electrical signal, an AD converter 15 that converts an analog image signal obtained by the CCD 13 into a digital image signal, an image processing unit 17 that processes the digital image signal, and a buffer memory 19 that appropriately stores data upon processing by the image processing unit 17. The file input device 50 also has a controller 21 that controls the image processing unit 17, a liquid crystal display (LCD) monitor 25, and an operation unit 23. Furthermore, the file input device 50 has a card slot that loads a recording medium 300 for reading/writing data from/to the recording medium 300.

<Data Format>

Figure 3:
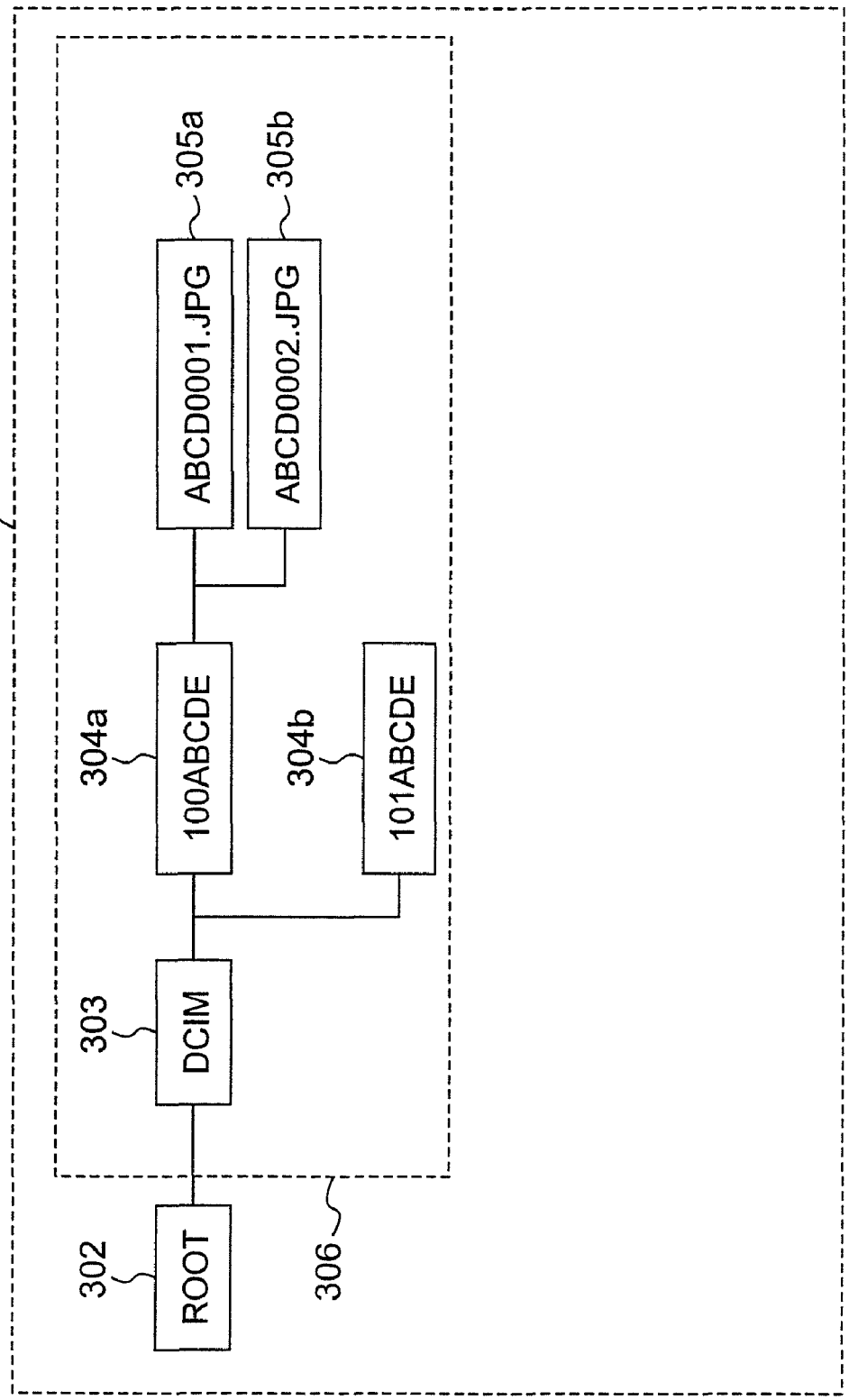
FIG. 3 is a diagram showing a basic configuration of folders and files in a recording medium.

FIG. 3 is a diagram showing a basic configuration of folders and files in the recording medium 300. In a folder/file configuration 301 of the recording medium 300, an image file storage folder tree 306 is arranged under a ROOT folder 302 which is a top-level folder. A top folder 303 is arranged under the image file storage folder tree 306. Subfolders 304a and 304b are arranged under the top folder 303. Image files 305a and 305b are arranged under the subfolder 304a.

Note that in the present embodiment image file storage rules in the folder/file configuration 301 comply with the DCF (Design rule for Camera File System) standard and thus the folder names and filenames of the top folder 303, the subfolders 304a and 304b, and the image files 305a and 305b are named in compliance with the DCF standard. The DCF standard defines that a still image file is stored in a subfolder created under a DCIM folder, and thus, also in the present embodiment, the image files 305a and 305b are stored in the subfolders 304a and 304b.

In the present embodiment, the subfolders 304a and 304b to which image files are recorded by a DCF-compliance digital camera are folders provided for the medium batch differential copy. The folder tree 306 is a folder tree including folders provided for the medium batch differential copy.

Figure 4:
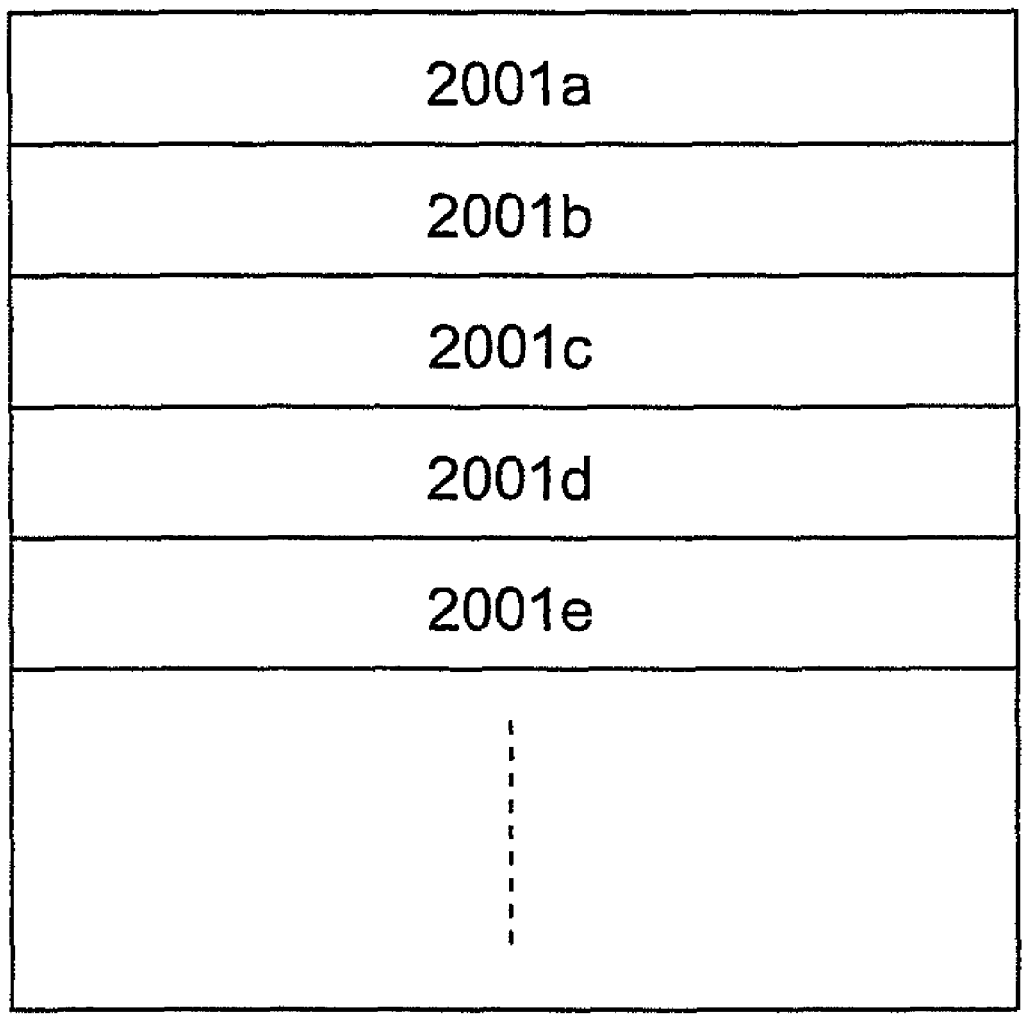
FIG. 4 is a diagram describing a configuration of a FAT file system including a plurality of directory items.

The recording medium 300 of the present embodiment uses, as file management information, a directory item in FAT16 file system or FAT32 file system. As shown in FIG. 4, FAT information in the FAT16 file system or the FAT32 file system includes a plurality of directory items 2001a, 2001b, 2001c . . . .

Figure 5:
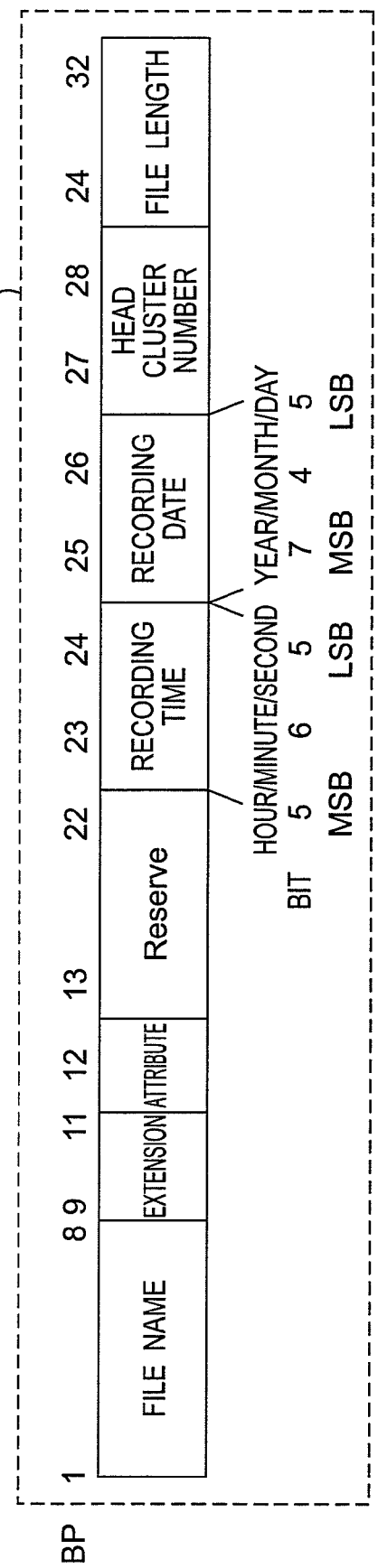
FIG. 5 is a diagram showing a format of a directory item which is file management information.

FIG. 5 is a diagram showing a format of a directory item of the FAT16 file system or the FAT32 file system. In the drawing, "BP" is an abbreviation of Byte Position and indicates a byte offset location. A directory item 2001 is provided for each file or each folder. Specifically, when a file or folder is newly created in the recording medium 300, a directory item corresponding to the file or folder is created, and information on creating time of the file or folder is written to a recording time field (BP23 to BP24) and a recording date field (BP25 to BP26). In the present invention, information stored in the recording time field and recording date field in FAT information is used as a file attribute information indicating file creating date and time.

<File Recording Device>

Figure 6:
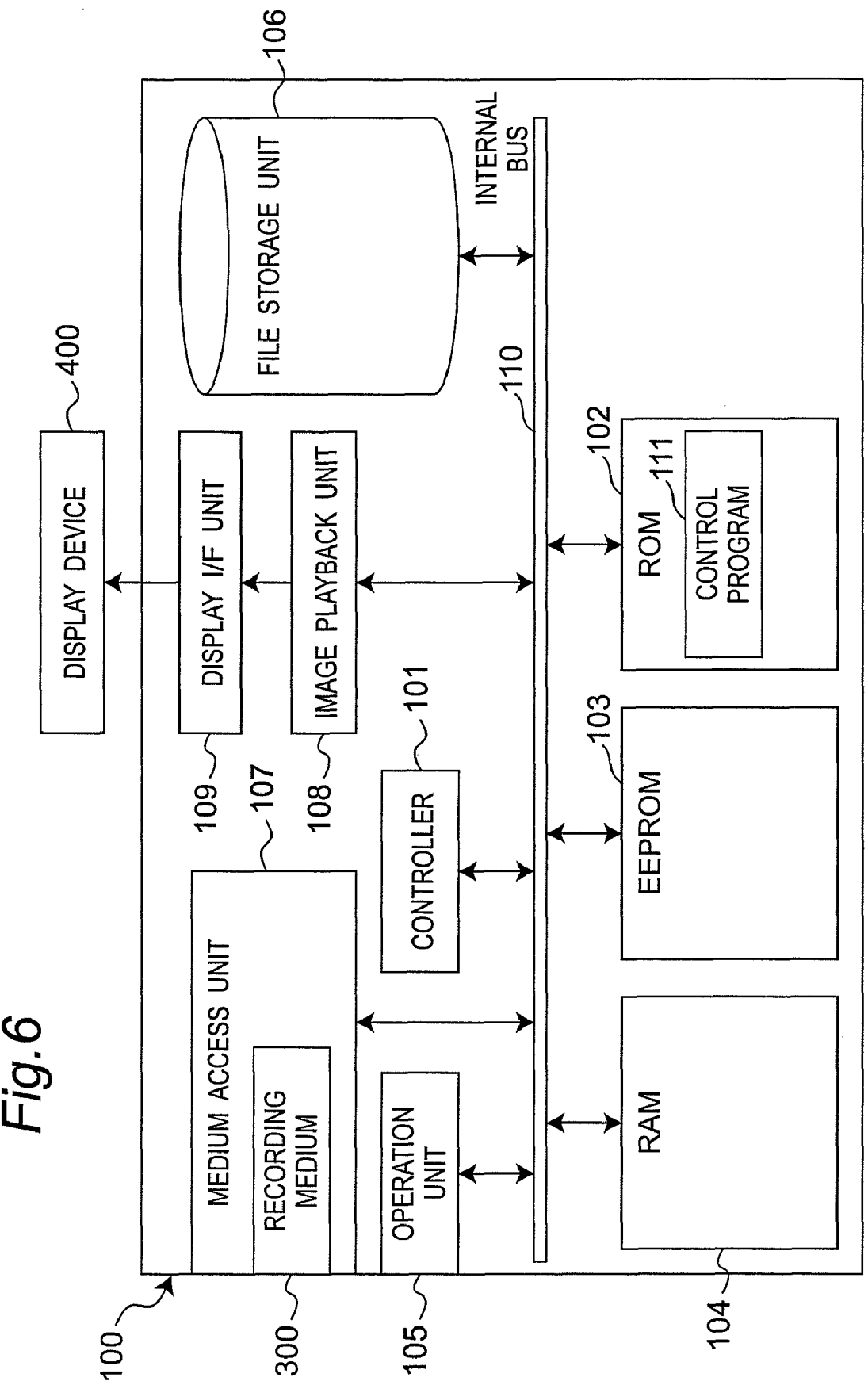
FIG. 6 is a block diagram showing a configuration of a file recording device of a first embodiment of the present invention.

FIG. 6 is a block diagram showing a configuration of the file recording device 100 in the first embodiment of the present invention. The file recording device 100 includes a control unit 101, a ROM 102, an EEPROM 103, a RAM 104, an operation unit 105, a file storage unit 106, a medium access unit 107, an image playback unit 108, a display I/F unit 109, and an internal bus 110.

Each of the control unit 101, the ROM 102, the EEPROM 103, the RAM 104, the operation unit 105, the file storage unit 106, the medium access unit 107, and the image playback unit 108 is connected to the internal bus 110. The control unit 101 is an MPU and reads out a control program 111 from the ROM 102 and executes the control program 111. When the control unit 101 requires a temporary work area upon executing the control program 111, the control unit 101 appropriately reserves a work area in the RAM 104. In the EEPROM 103 are recorded configuration information on the file recording device 100, etc., and the control unit 101 reads out such information when required for execution of the control program 111.

The operation unit 105 is a control panel including a group of buttons and a small-size liquid crystal display device, and also has a signal processing function trigged by a remote control of the file recording device 100. The file storage unit 106 includes a mass recording medium such as a hard disk and a drive unit thereof and stores still image files and moving image files. The medium access unit 107 accesses a recording medium 300 to read out still image files or moving image files stored therein. For the recording medium 300, there are an SD memory card, a CompactFlash, and the like.

The image playback unit 108 plays back the still image files or moving image files recorded in the file storage unit 106 and outputs a playback signal to an external display device 400, such as a television set, through the display I/F unit 109.

<Medium Batch Differential Copy>

A medium batch differential copy refers to a process of collectively copying image files stored in the recording medium 300 to the file recording device 100, in which all image files stored in the recording medium 300 are not copied but only those files (differential) that have not been stored in a copy destination.

Figure 7:
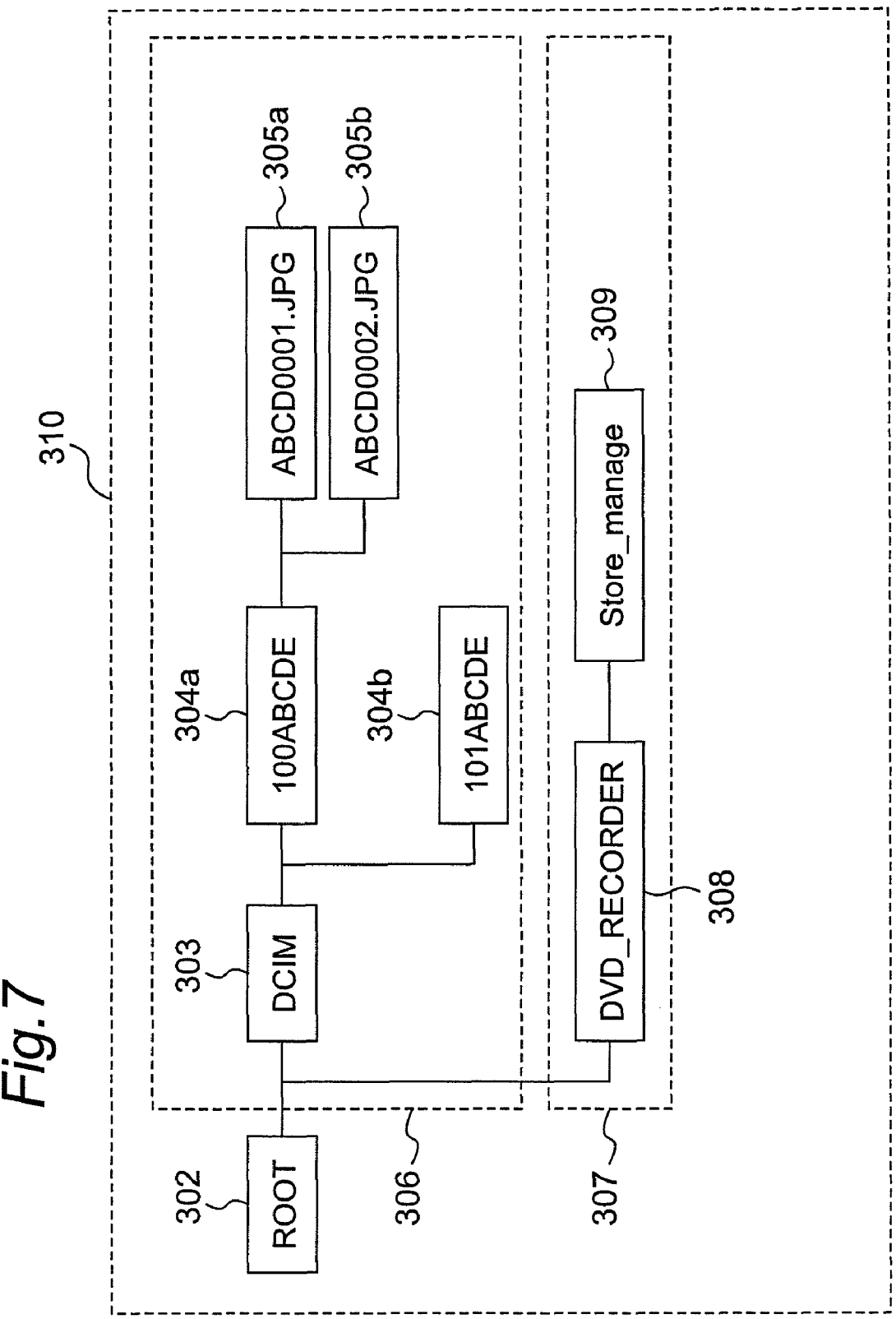
FIG. 7 is a diagram showing a configuration of folders/files in a recording medium in which a batch differential copy management file is disposed.

Particularly, in the present embodiment, when a medium batch differential copy is performed, information about date and time on which the medium batch differential copy is completed is recorded in the recording medium 300. Specifically, copy completion date and time information is stored in a predetermined folder in the recording medium 300. For example, in the case where the recording medium 300 has the folder configuration shown in FIG. 3, when a medium batch differential copy is performed, as shown in FIG. 7, a batch differential copy management file storage folder ("DVD_RE-CORDER") 308 is provided under the ROOT folder 302 which is a top-level folder in parallel with the folder tree 306 which is subject to the medium batch differential copy. A batch differential copy management file ("Store_manage") 309 indicating copy completion date and time information is stored under the batch differential copy management file storage folder 308. Note that in the present embodiment a filename of the medium batch differential copy management file 309 is set to "Store_manage", the batch differential copy management file storage folder 308 is arranged directly beneath the ROOT folder 302, and a folder name thereof is set to "DVD_RECORDER".

Figure 8:
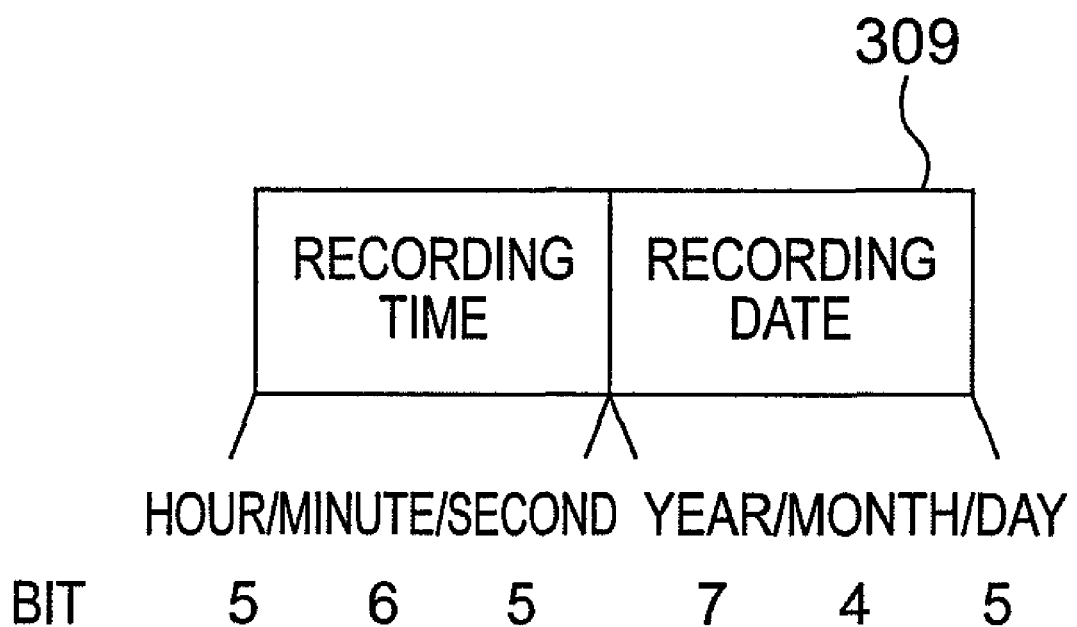
FIG. 8 is a diagram showing a format of copy completion date and time information in the batch differential copy management file.

FIG. 8 is a diagram showing a format of copy completion date and time information to be recorded in the batch differential copy management file 309. The copy completion date and time information has the same format as that of the recording time field and recording date field of the directory item 2001 shown in FIG. 5, and respectively includes a 16-bit recording time field and a 16-bit recording date field. Bit assignments for the time/minute/second of the recording time field and the year/month/day of the date field are as shown in FIG. 8.

<Medium Batch Differential Copy Process>

Figure 9:
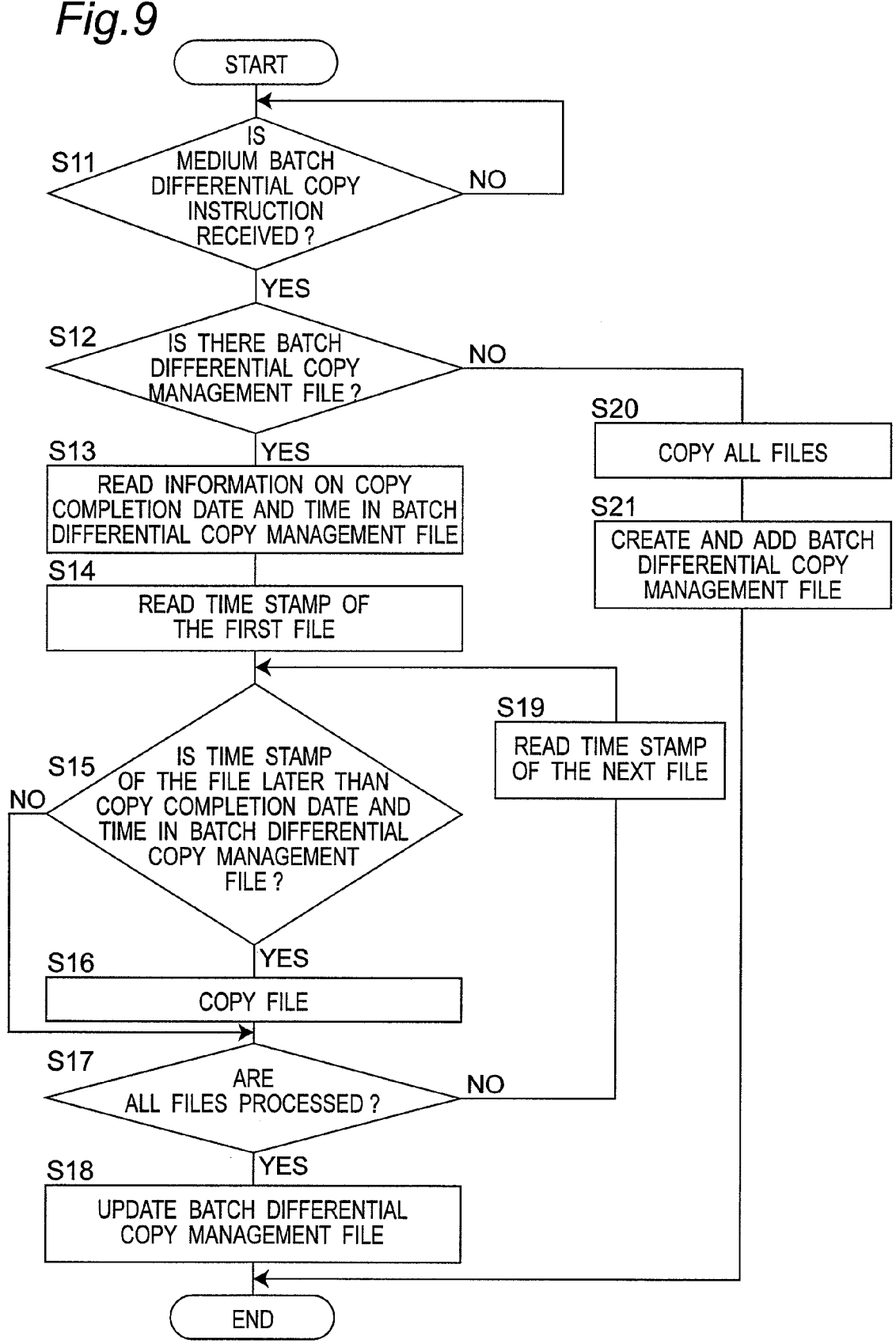
FIG. 9 is a flowchart of a medium batch differential copy process performed by the file recording device.

FIG. 9 is a flowchart of a medium batch differential copy process performed by the file recording device 100. This process is implemented when the control unit 101 executes the control program 111. FIGS. 10A to 10D are diagrams showing a state transition of the batch differential copy management file 309 and directory items in the recording medium 300 along with the medium batch differential copy process.

The medium batch differential copy process will be described below with reference to the flowchart of FIG. 9 and FIGS. 10A to 10D.

Referring to FIG. 9, when the control unit 101 of the file recording device 100 receives a medium batch differential copy instruction (S11), the control unit 101 determines whether there is a batch differential copy management file 309 in the recording medium 300 (S12). Here, the medium batch differential copy instruction may, for example, be generated automatically when the medium access unit 107 detects insertion of the recording medium 300, or generated based on an operation for a copy instruction performed by a user on the operation unit 105 (the same applies to the following embodiments).

If there is no batch differential copy management file 309 in the recording medium 300, it is determined that a medium batch differential copy process has never been performed on the recording medium 300. Thus, in this case, all files in the recording medium 300 are copied to the file storage unit 106 of the file recording device 100 (S20). Then, a batch differential copy management file 309 containing data indicating copy completion date and time is created and recorded in the recording medium 300 (S21).

FIG. 10A shows a state of the recording medium 300 for the case in which a medium batch differential copy has not been performed. Two image files 305a and 305b are stored and there are directory items 2001a and 2001b that respectively manage the image files 305a and 305b. Note that, in FIG. 10A, logical information of a filename field (BP1 to BP8), an extension field (BP9 to BP11), and a time information field (BP23 to BP26) in the directory item fields are described in the directory items 2001a and 2001b. Since a medium batch differential copy has never been performed, there is no batch differential copy management file 309.

In the case shown in FIG. 10A, when the recording medium 300 has a directory configuration such as that shown in FIG. 3, at the above-described step S12, since there is no batch differential copy management file storage folder named "DVD_RECORDER" under a ROOT folder 302, it is determined that there is no batch differential copy management file 309 (S12). Thus, all image files 305a and 305b stored in the folder tree 306 which is subject to the medium batch differential copy are copied to the file storage unit 106 of the file recording device 100 (S20). After completion of the copy of all image files, as shown in FIG. 7, a batch differential copy management file storage folder 308 named "DVD_RE-CORDER" is created under the ROOT folder 302, under which a batch differential copy management file 309 with the filename "Store_manage" is created. Then, copy completion date and time information is written in the "Store_manage" file (S21).

When in the state shown in FIG. 10A the first medium batch differential copy was completed on Jan. 1, 2005, 01:01:01, the state transfers to a state shown in FIG. 10B. In the FIG. 10B, a batch differential copy management file 309 is created, and the medium batch copy completion date and time "Jan. 1, 2005, 01:01:01" is recorded.

Returning to FIG. 9, if the batch differential copy management file 309 is already recorded in the recording medium 300 (S12), it is determined that the medium batch differential copy process has been performed at least once on the recording medium 300. Thus, in this case, only those files in the recording medium 300 that have not been copied to the file recording device 100 yet are copied to the file recording device 100. For this purpose, the medium batch copy completion date and time is compared with time stamps of the files to be copied (hereinafter, this process is referred to as a "time stamp check"). As a result of the time stamp check, only those files with time stamps newer than the medium batch copy completion date and time are copied to the file recording device 100. Such a time stamp check and a copy process are performed on all image files which are candidates for the copy. In the present embodiment, as a time stamp, time information written in the time information field (BP23 to BP26) of the directory item 2001 is used.

More specifically, the copy completion date and time information in the batch differential copy management file 309 is read out from the recording medium 300 (S13). Subsequently, by referring to FAT information in the recording medium 300, a time stamp (recording time and recording date) of the first file is read out (S14). Then, the copy completion date and time indicated by the batch differential copy management file 309 is compared with the time stamp of the file (S15).

If the recording date and time indicated by the time stamp of the file is later than the copy completion date and time, it can be determined that the file is one added to the recording medium 300 after the last copy from the recording medium 300 to the file recording device 100 and one that has not been copied to the file recording device 100 yet. Accordingly, the file is copied to the file storage unit 106 of the file recording device 100 (S16).

On the other hand, if the recording date and time indicated by the time stamp of the file is the same as or earlier than the copy completion date and time, it can be determined that the file is one that has already been copied to the file recording device 100. Thus, the file is not copied.

Determination is made on whether all files in the recording medium 300 have been processed (S17), and if there still remain files that should be processed, recording date and time information on the next file is read out (S19) and the above-described process is repeated (S15 to S17). As described above, the differential copy is performed by comparing the copy completion date and time indicated by the batch differential copy management file 309 with the time stamp of the file and determining whether the file is not copied yet.

If all files in the recording medium 300 have been processed, finally, the copy completion date and time information in the batch differential copy management file 309 is updated (S18) and the process ends.

In the state as shown in FIG. 10B which is the state after the first medium batch differential copy, when an image file 305c is further created on Jan. 15, 2005, 01:01:01, the state shifts to a state shown in FIG. 10C. In FIG. 10C, a directory item 2001c for the image file 305c is added and the corresponding filename (with an extension) and creation date and time (Jan. 15, 2005, 01:01:01) are written. When a medium batch differential copy is performed from the recording medium 300 having the folder/file configuration shown in FIG. 10C, since there is a batch differential copy management file 309 named "Store_manage" in the batch differential copy management file storage folder 308 named "DVD_RECORDER" under the ROOT folder 302, content thereof is read to obtain medium batch copy completion time (Jan. 1, 2005, 01:01:01).

In the state of FIG. 10C, the medium batch copy completion date and time is Jan. 1, 2005, 01:01:01 and the time stamps of the image files 305a and 305b respectively show Sep. 3, 2004, 01:01:01 and Sep. 6, 2004, 01:01:01 (2001a and 2001b) which are older than the medium batch copy completion date and time. Thus the image files 305a and 305b are not targets for copy. On the other hand, the image file 305c is created on Jan. 15, 2005 01:01:01 and a time stamp is provided with that date (2001c) which is newer than the medium batch copy completion date and time. Thus the image file 305c is copied. After completion of the copy, the copy completion date and time information (Feb. 1, 2005, 01:01:01) is written in the batch differential copy management file 309.

In the present embodiment, a batch differential copy management file is stored in a recording medium which is a copy source. With this configuration, even when there are a plurality of recording media subject to a medium batch differential copy, information on medium batch differential copy completion date and time can be obtained from each recording medium which is a copy source upon medium batch differential copy. Thus, there is an advantageous effect that a file recording device does not need to manage storage locations of batch differential copy management files for each recording medium.

In addition, in the present embodiment, a determination as to whether a copy of a file has been performed can be made only by comparing information in a batch differential copy management file stored in the recording medium 300 with creation date and time information indicated by file attribute information. Thus, it is enough to do checks only a number of times corresponding to the number of files stored in the recording medium. Accordingly, the number of times of checks can be significantly reduced over conventional cases. Also, since information about file creation date and time is obtained by referring to FAT information, there is no need to open a file to read out information about file creation date and time. Thus a high-speed process can be achieved. This is a very important point for the file recording device 100 such as a DVD recorder having a relatively low throughput.

<Process of File Input Device>

As described above, a batch differential copy management file is recorded in the recording medium 300 by the file recording device 100. The file input device 50 of the present embodiment recognizes whether there are backup copies of image files stored in the recording medium 300, by referring to the batch differential copy management file. A process of the file input device 50 for implementing such a function will be described below with reference to a flowchart of FIG. 11.

Figure 11:
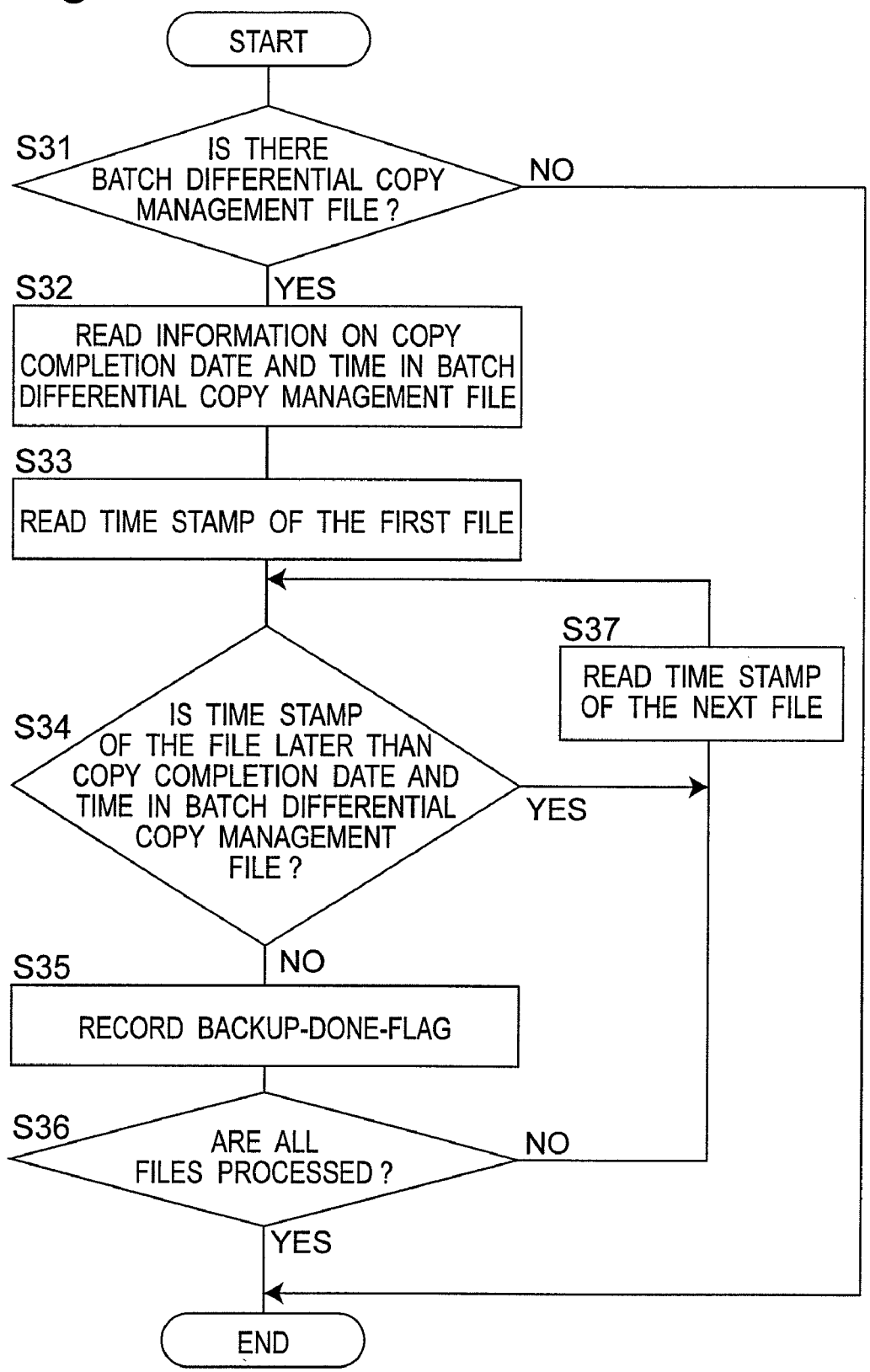
FIG. 11 is a flowchart of a process of the file input device.

The process shown in the flowchart in FIG. 11 is performed by the controller 21 when the file input device 50 shifts to a playback mode or is powered on. In the process, the file input device 50 checks on image files recorded in the recording medium 300 to determine whether the image files have been backed up to another recording medium (e.g., a recording medium of the file recording device 100) and stores the result of the determination.

In FIG. 11, the controller 21 of the file input device 50 determines whether there is a batch differential copy management file 309 in the recording medium 300 (S31). If there is no batch differential copy management file 309, the process ends.

If there is a batch differential copy management file 309 in the recording medium 300, copy completion date and time information in the batch differential copy management file 309 is read out from the recording medium 300 (S32). Subsequently, by referring to FAT information in the recording medium 300, a time stamp (recording time and recording date) of the first file is read out (S33). Then, the copy completion date and time indicated by the batch differential copy management file 309 is compared with the time stamp of the file (S34).

If the recording date and time indicated by the time stamp of the file is later than the copy completion date and time, it can be determined that the file is one added to the recording medium 300 after the files in the recording medium 300 are copied last time and thus the file is one that has not been backed up. On the other hand, if the recording date and time indicated by the time stamp of the file is the same as or earlier than the copy completion date and time, it is determined that the file has been backed up.

If the recording date and time indicated by the time stamp of the file is the same as or earlier than the copy completion date and time, information (hereinafter, referred to as a "backup-done-flag") indicating that the file to be copied has been backed up is written in the buffer memory 19 (S35). On the other hand, if the recording date and time indicated by the time stamp of the file is later than the copy completion date and time, the process proceeds for a next file (S37).

It is determined whether all files in the recording medium 300 have been checked whether there are backups thereof (S36) and if there still remain files that should be processed, recording date and time information on the next file is read out (S37) and the above-described process is repeated (S34 to S36).

In the above-described manner, the file input device 50 determines whether all image files recorded in the recording medium 300 have been backed up and stores the results of the determination in the buffer memory 19 with backup-done-flags.

Figure 12A:
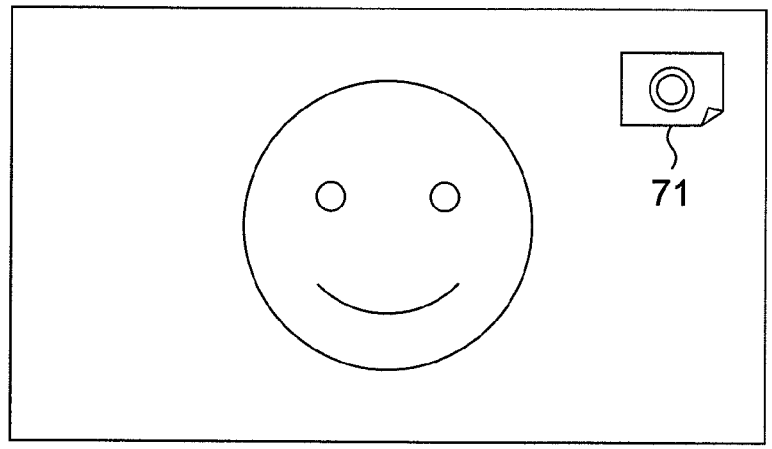
FIGS. 12A to 12C are diagrams showing exemplary displays of a backup-is-done mark.
Figure 12B:
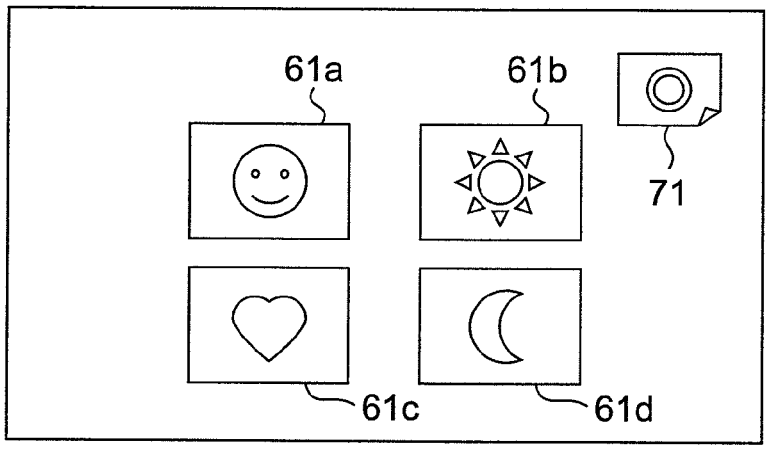
Figure 12C:
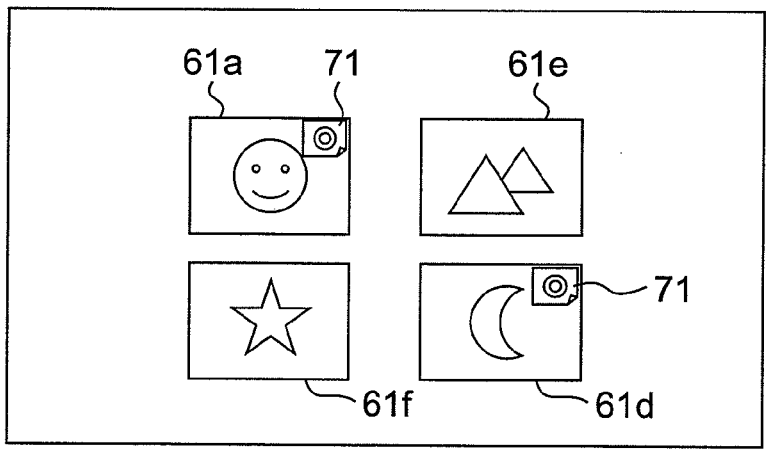

When playing back an image file recorded in the recording medium 300, the file input device 50 refers to a corresponding backup-done-flag stored in the buffer memory 19 and if the image file of the playback image has been backed up, a mark (hereinafter, referred to as a "backup-is-done mark") representing that a backup is done is displayed together with the image. FIGS. 12A to 12C show exemplary displays of the backup-is-done mark. FIG. 12A shows an example in which a backup-is-done mark 71 is added to one image. The backup-is-done mark 71 indicates that an image file corresponding to the image shown in FIG. 12A has been backed up. FIG. 12B shows an example in which one backup-is-done mark 71 is displayed for a plurality of thumbnail images 61a to 61d. In this example, the backup-is-done mark 71 indicates that image files respectively corresponding to the four thumbnail images 61a to 61d have been backed up. FIG. 12C shows an example in which the backup-is-done marks 71 are added only to thumbnail images 61a and 61d among a plurality of thumbnail images 61a, 61b, . . . . In this example, the backup-is-done marks 71 indicate that only image files corresponding to the thumbnail images 61a and 61d have been backed up.

The backup-done-flag recorded in the above-described manner can also be used when deleting backed-up files. The controller 21 of the file input device 50 can easily recognize whether each image file recorded in the recording medium 300 has been backed up, by referring to the backup-done-flags stored in the buffer memory 19.

Figure 13A:
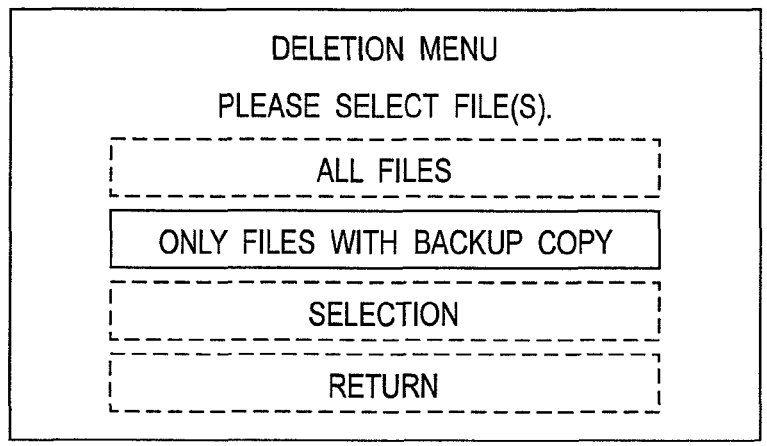
FIGS. 13A to 13C are diagrams showing a deletion menu for deleting all or some of image files recorded in the recording medium.
Figure 13B:
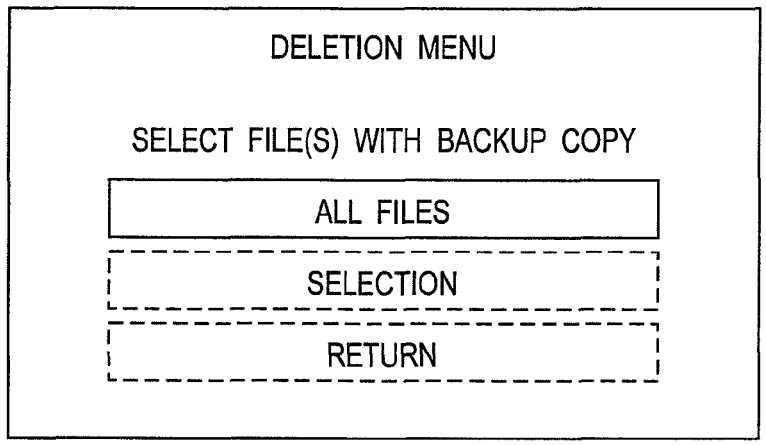
Figure 13C:
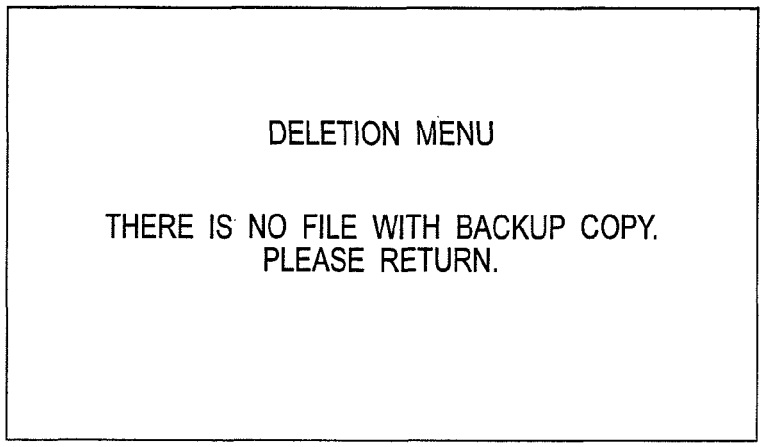

FIGS. 13A to 13C are diagrams showing a deletion menu for deleting all or some of image files recorded in the recording medium 300 in the image input device 50. FIG. 13A shows a plurality of selection items for identifying a file(s) to be deleted. When "ONLY BACKED-UP FILES" is selected in FIG. 13A, the deletion menu shown in FIG. 13B is displayed. FIG. 13B shows a plurality of selection items for further identifying a file(s) to be deleted in all of backed-up files. In the deletion menu in FIG. 13B, when "ALL FILES" is selected, the controller 21 refers to the backup-done-flags to identify image files to be deleted and deletes the image files. As a result of referring to the backup-done-flags, when there are no backed-up files and thus image files to be deleted cannot be found, a deletion menu shown in FIG. 13C is displayed. When "SELECTION" is selected in FIG. 13B, the controller 21 refers to the backup-done-flags to identify candidates for image files to be deleted, displays the candidates on the LCD monitor 25, and waits for user's instruction. When image files to be deleted are individually designated by the user, the controller 21 deletes the designated image files.

As described above, use of the backup-done-flag allows identification of backed-up image files to be easily and quickly implemented. With this configuration, upon playing back image files, information indicating that the image files have been backed up can be easily displayed, and simplification of a process is achieved also in deleting backup files.

Second Embodiment

In the present embodiment, a configuration will be described in which, even when a medium batch differential copy is performed from one recording medium by each of a plurality of file recording devices, the differential copy can be properly performed for each file recording device. For this purpose, each of a plurality of file recording devices stores "medium batch copy completion date and time" in a batch differential copy management file 309 which corresponds to each device, in a recording medium 300 which is a copy source. Each file recording device performs a medium batch differential copy by referring to the corresponding "medium batch copy completion date and time".

A determination by a time stamp check as to whether an image file has been copied or not is the same as that in the first embodiment. A difference from the first embodiment is that a batch differential copy management file 309 is stored or referred to in a format that allows identifying of a file recording device that has created and updated the batch differential copy management file 309.

<System Configuration>

A configuration of the present embodiment will be described below with reference to the drawings.

Figure 14:
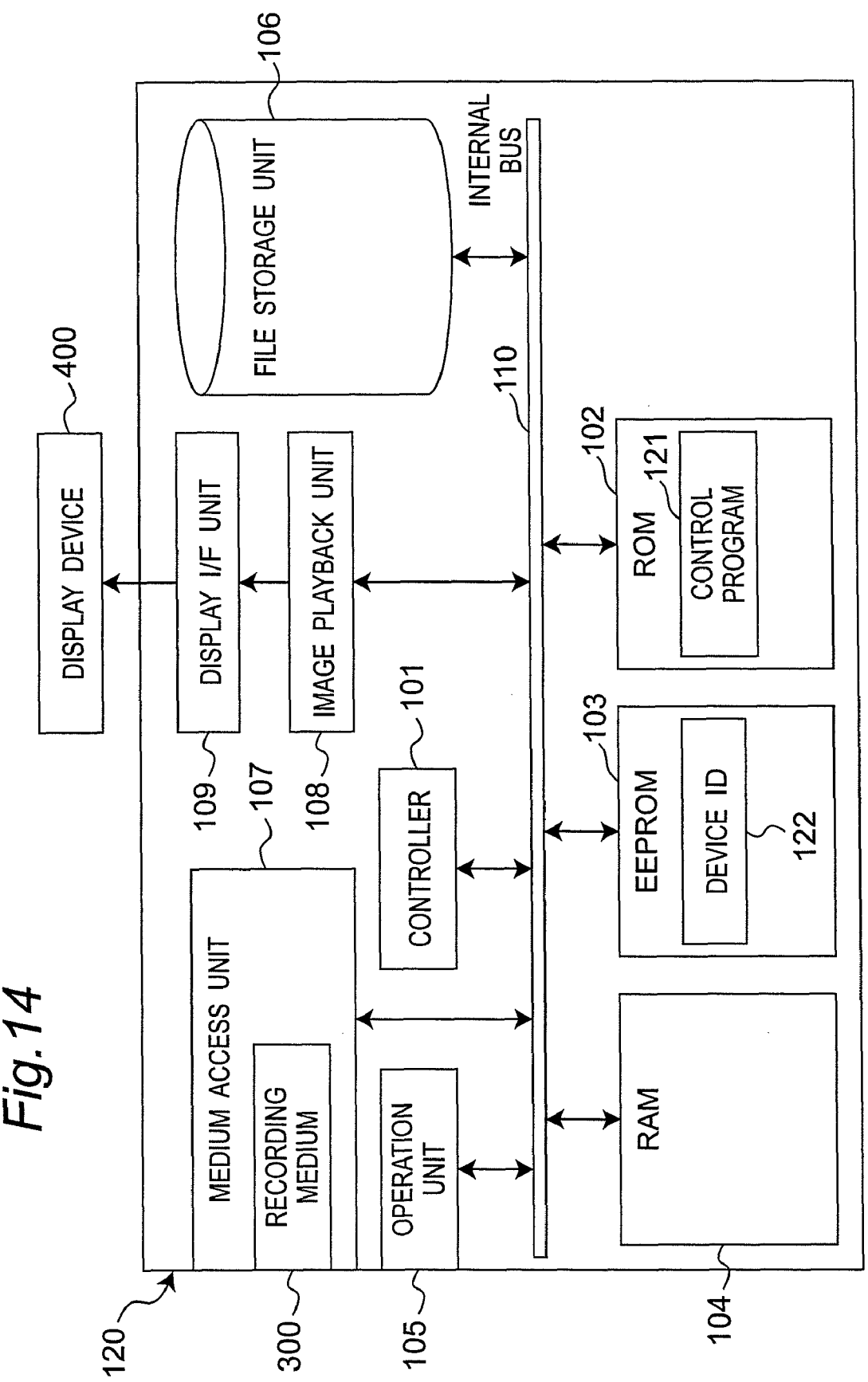
FIG. 14 is a block diagram showing a configuration of a file recording device of a second embodiment of the present invention.

FIG. 14 is a block diagram showing a configuration of a second embodiment of a file recording device of the present invention. In a file recording device 120 shown in FIG. 14, components having functions similar to those of the file recording device 100 shown in FIG. 6 are denoted by the same reference numerals.

The file recording device 120 of the present embodiment is different from the file recording device 100 of the first embodiment in that information for identifying a file recording device that has created or updated a batch differential copy management file 309 is recorded in the batch differential copy management file 309. In the present embodiment, a device ID which is a code unique to each file recording device is used as information for identifying a file recording device. Specifically, a device ID is included in a filename of a batch differential copy management file 309. A control program 121 of the file recording device 120 of the present embodiment complies with such a file naming rule.

A device ID 122 is stored in an EEPROM 103 upon manufacturing the file recording device 120. For a code that can be used as the device ID 122, there is a manufacturing serial number, and in the present embodiment a manufacturing serial number made up of a 5-digit number is used.

Figure 15:
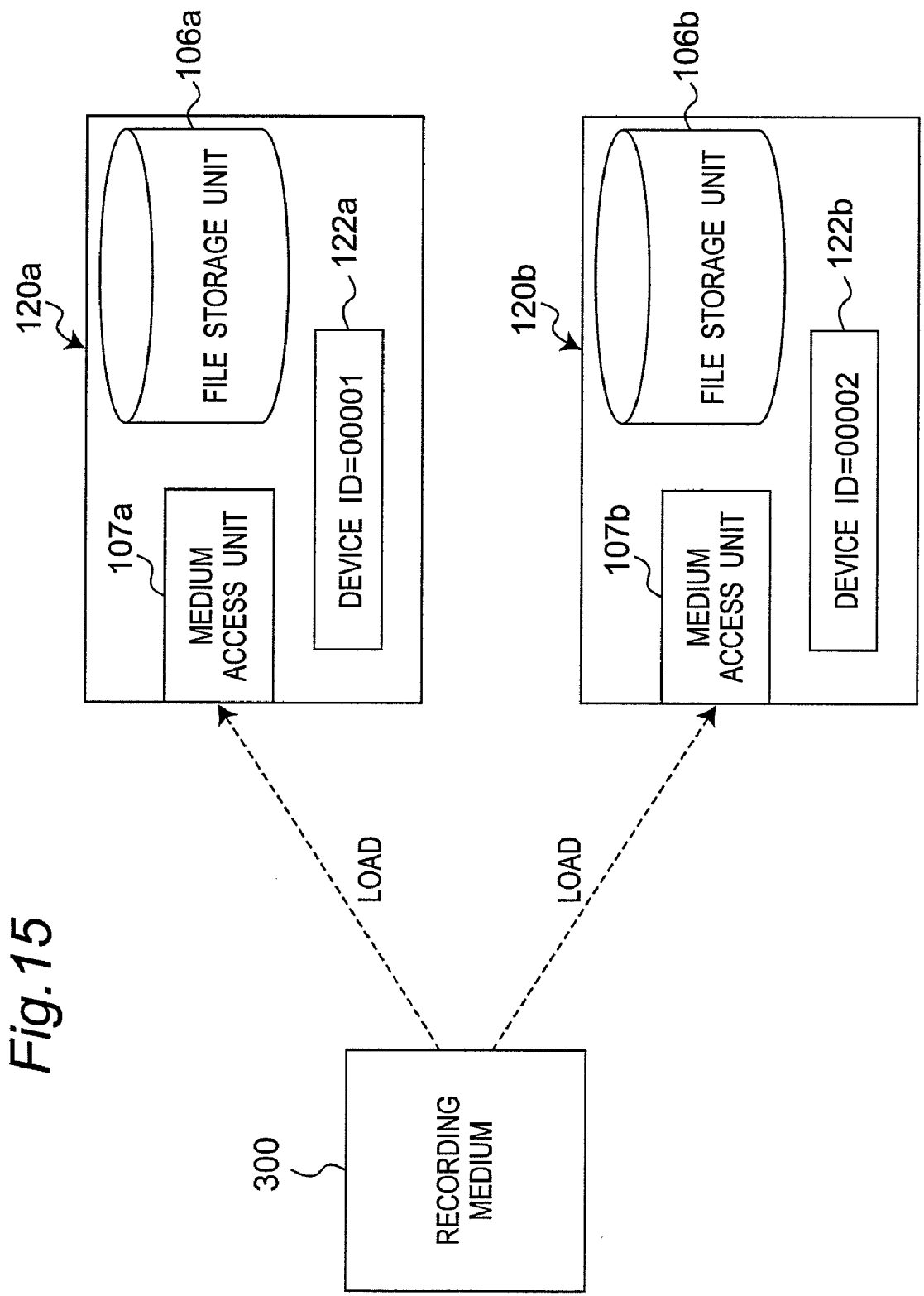
FIG. 15 is a diagram describing a concept of a medium batch differential copy performed by two file recording devices.

FIG. 15 is a diagram describing a concept of a medium batch differential copy performed by two file recording devices 120a and 120b. The file recording device 120a stores, as a device ID 122a, a manufacturing serial number "00001" assigned to the file recording device 120a. The file recording device 120b stores, as a device ID 122b, a manufacturing serial number "00002" assigned to the file recording device 120b.

Figure 16:
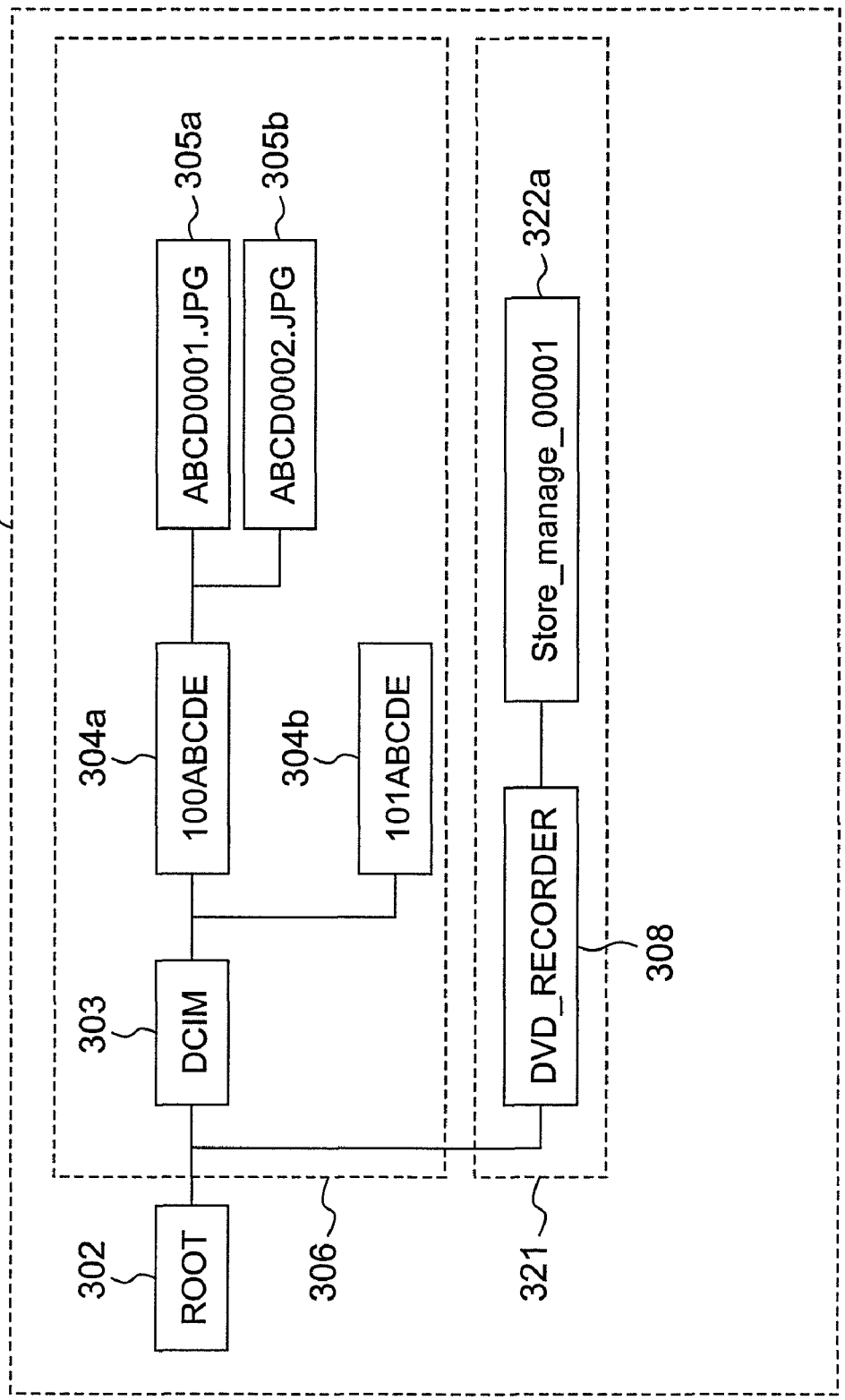
FIG. 16 is a diagram showing a configuration of folders and files in a recording medium after a medium batch differential copy done by one file recording device.

FIG. 16 is a diagram showing a folder/file configuration after the first medium batch differential copy is performed on the folder/file configuration 301 shown in FIG. 3 by the file recording device 120a of the present embodiment. As shown in the drawing, "Store_manage_00001" 322a is added as a batch differential copy management file for the file recording device 120a. Note that in a folder/file configuration 320 the same components as those in the folder/file configuration 301 shown in FIG. 3 are denoted by the same reference numerals.

Figure 17:
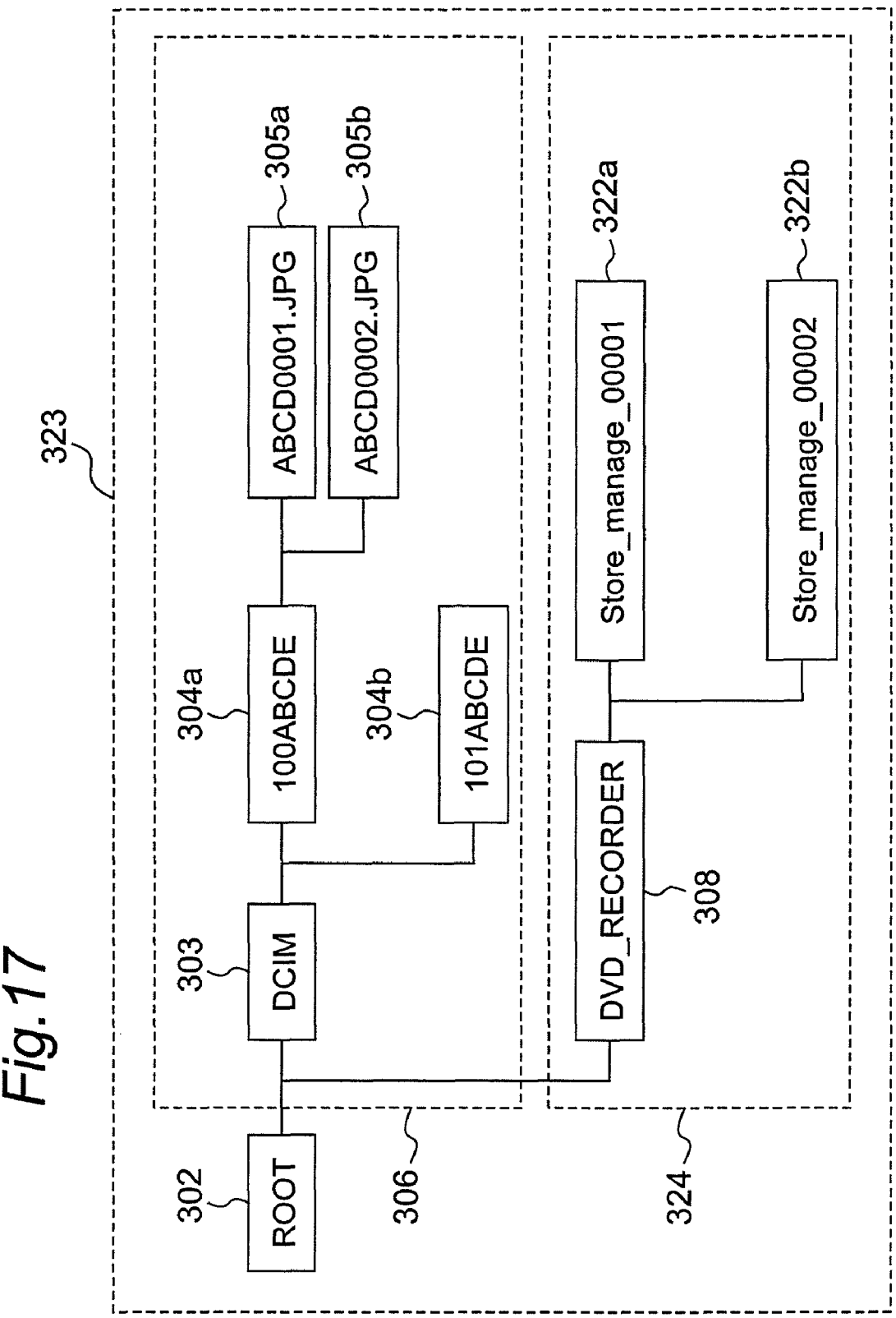
FIG. 17 is a diagram showing a configuration of folders and files in the recording medium after a medium batch differential copy done by another file recording device with the folder/file configuration shown in FIG. 16.

FIG. 17 is a diagram showing a folder/file configuration after the first medium batch differential copy is further performed by the file recording device 120b of the present embodiment on the folder/file configuration 320 shown in FIG. 16. As shown in the drawing, "Store_manage_00002" 322b is added as a batch differential copy management file for the file recording device 120b. As such, in the present embodiment, the batch differential copy management files 322a and 322b are provided for the respective file recording devices.

Naming/storage rules for a batch differential copy management file in the present embodiment will be described. The naming/storage rules are as follows.

1) A batch differential copy management file is a combination of the character string "Store_manage_" and a device ID 122 of a device. For example, when the device ID 122 is "00001", a batch differential copy management file of the device is named "Store_manage_00001".

2) The batch differential copy management files 322a and 322b are stored in a "DVD_RECORDER" folder 308 under a ROOT folder 302.

3) Upon performing a medium batch differential copy by a certain device, when there is no "DVD_RECORDER" folder 308 or no batch differential copy management file 309 for the device, a "DVD_RECORDER" folder 308 and a batch differential copy management file for the device are created upon completion of the medium batch differential copy.

The file recording device 120 can identify, according to the above-described rules and based on a device ID 122 thereof, a filename of a medium batch differential copy management file 309 for itself and a storage folder in the recording medium 300 and read out the batch differential copy management file 309 thereof from the recording medium 300.

Note that in the present embodiment the format of a medium batch differential copy management file is the same as that of a time stamp in a file management information table in the recording medium 300 similar to the first embodiment (see FIG. 8).

<Medium Batch Differential Copy Process>

Figure 18:
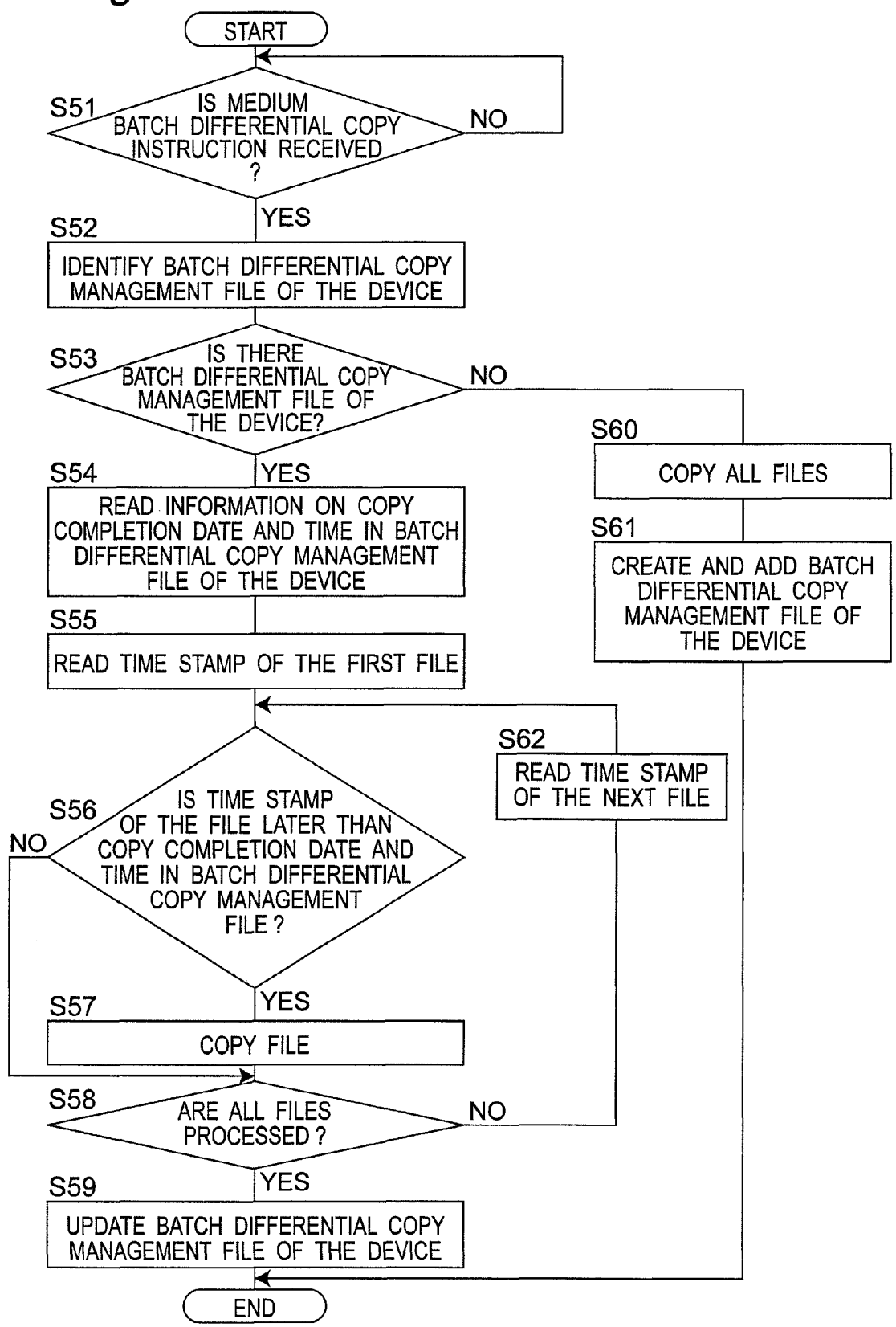
FIG. 18 is a flowchart of a medium batch differential copy process in the second embodiment.

FIG. 18 is a flowchart showing a flow of a medium batch differential copy process in the present embodiment. With reference to the drawing, a medium batch differential copy process by the file recording device 120 of the present embodiment will be described below. Note that the following describes the case in which a medium batch differential copy is performed from the recording medium 300 to a certain file recording device (hereinafter, referred to as the "target device") 120.

When a control unit 101 of the target device 120 receives a medium batch differential copy instruction with the recording medium 300 being inserted into a medium access unit 107 of the target device 120 (S51), the control unit 101 reads out a device ID thereof (target device) and identifies a filename of a batch differential copy management file for the device (S52).

Subsequently, it is determined whether there is the batch differential copy management file for the target device 120 in the recording medium 300 (S53).

If there is no batch differential copy management file for the target device 120 in the recording medium 300, it is determined that a medium batch differential copy process by the target device 120 has never been performed on the recording medium 300. Thus, in this case, all files in the recording medium 300 are copied to a file storage unit 106 of the target device (S60).

Then, a batch differential copy management file that contains data indicating copy completion time is created and recorded in the recording medium 300 (S61).

On the other hand, if the batch differential copy management file 309 for the target device 120 is already recorded in the recording medium 300 (S53), it is determined that a medium batch differential copy process has been performed by the target device 120 at least once on the recording medium 300. Thus, in this case, only those files in the recording medium 300 that have not been copied are copied to the target device 120.

For this purpose, copy completion date and time information in the batch differential copy management file for the target device 120 is read out from the recording medium 300 (S54). Subsequently, by referring to FAT information in the recording medium 300, a time stamp (recording time and recording date) of the first file is read out (S55). Then, copy completion date and time indicated by the batch differential copy management file is compared with the time stamp of the file (S56).

If the recording date and time indicated by the time stamp of the file is later than the copy completion date and time, it can be determined that the file is one added to the recording medium 300 after the last copy from the recording medium 300 to the target device 120 and thus the file is one that has not been copied to the target device 120a yet. Accordingly, the file is copied to the file storage unit 106 of the target device 120 (S57).

On the other hand, if the recording date and time indicated by the time stamp of the file is the same as or earlier than the copy completion date and time, it can be determined that the file is one that has already been copied to the target device 120. Thus, the file is not copied.

It is determined whether all files in the recording medium 300 have been processed (S58). If there still remain files that should be processed, recording date and time information on a next file is read out (S62) and the above-described process is repeated (S56 to S58).

When all files in the recording medium 300 are processed, finally, the copy completion date and time information in the batch differential copy management file for the target device 120 is updated (S59) and the process ends.

Referring to the above-described flow, specific examples of the medium batch differential copy process will be described below for each of the "case in which a medium batch differential copy from the recording medium 300 to a target device has not been performed" and the "case in which a medium batch differential copy from the recording medium 300 to a target device has already been performed".

(1) The Case in which a Medium Batch Differential Copy from a Recoding Medium to a Target Device has not been Performed The present case is further divided into:

i) a subcase in which a medium batch differential copy has never been performed even to another file recording device; and ii) a subcase in which a medium batch differential copy has been performed to another file recording device.

i) The Subcase in which a Medium Batch Differential Copy has Never been Performed Even to Another File Recording Device A folder/file configuration of the recording medium 300 in which a medium batch differential copy has never been performed by any file recording device is the configuration 301 shown in FIG. 3. Here, assuming that the target device is the file recording device 120a shown in FIG. 15, since a device ID thereof is "00001", a filename of a batch differential copy management file for the target device 120a is "Store_manage__00001" (S52). That is, the "Store_manage__00001" file under the "DVD_RECORDER" folder under the ROOT folder 302 is the batch differential copy management file for the target device 120a.

Since in the folder/file configuration 301 shown in FIG. 3 there is no "DVD_RECORDER" folder, it is determined that there is also no "Store_manage__00001" file (S53) and thus the image files 305a and 305b stored in the medium batch differential copy target folder tree 306 are unconditionally copied to the file storage unit 106a of the target device 120a (S60).

After completion of the copy, a batch differential copy management file storage folder 308 named "DVD_RECORDER" is created under the ROOT folder 302, and a batch differential copy management file 309 with the filename "Store_manage__00001" (S61) is crated and updated under the batch differential copy management file storage folder 308 (S61). After such a process, the folder/file configuration turns to the configuration 320 shown in FIG. 16.

ii) The Subcase in which a Medium Batch Differential Copy has been Performed to Another File Recording Device It is assumed that the target device is the file recording device 120b shown in FIG. 15 and the other file recording device is the file recording device 120a. A folder/file configuration of the recording medium 300 in which a medium batch differential copy has been performed by the other file recording device 120a is the configuration 320 such as that shown in FIG. 16.

Since a device ID of the target device 120b is "00002", a filename of a batch differential copy management file for the device 120b is "Store_manage_00002". That is, the file "Store_manage_00002" under the "DVD_RECORDER" folder under the ROOT folder 302 is the batch differential copy management file for the target device 120b (S52).

Although there is a "DVD_RECORDER" folder in the folder/file configuration 320 shown in FIG. 16, there is no "Store_manage_00002" file under the "DVD RECORDER" folder (S53). Thus, the image files 305a and 305b stored in the folder tree 306 which is a target for the medium batch differential copy are unconditionally copied to the file storage unit 106b (S60). After completion of the copy, a batch differential copy management file with the filename "Store_manage_00002" is created and updated under the "DVD_RECORDER" folder (S61). After such a process, the folder/file configuration turns to the configuration 323 shown in FIG. 17.

(2) The Case in which a Medium Batch Differential Copy from a Recording Medium to a Target Device has Already been Performed The case will be considered in which the target device is the file recording device 120a shown in FIG. 15 and a folder/file configuration of the recording medium 300 in which a medium batch differential copy by the target device 120a has been performed is the configuration 323 shown in FIG. 17. Since a device ID of the target device 120a is "00001", a filename of a batch differential copy management file for the target device 120a is "Store_manage_00001" (S52). That is, the file "Store_manage_00001" under the "DVD_RECORDER" folder under the ROOT folder 302 is the batch differential copy management file for the target device 120a.

Since in the folder/file configuration 323 there is already a "Store_manage_00001" file 322a under the "DVD_RECORDER" folder 308, copy completion date and time is read out therefrom (S54), a time stamp check is performed (S56), and a copy is performed (S57). After completion of the copy, the batch differential copy management file "Store_manage_00001" is updated (S59).

As such, in the present embodiment, in the recording medium 300, a batch differential copy management file is recorded for each file recording device. With this configuration, even when the recording medium 300 is accessed from a plurality of file recording devices, each file recording device can read out the associating batch differential copy management file for the device from the recording medium 300, and thus can properly implement a medium batch differential copy from the recording medium 300 to a file storage unit of the device according to the current copy state.

Third Embodiment

Although in the second embodiment a device ID is used as information identifying a file recording device, in the present embodiment a unique code assigned to a communication means of a file recording device or a code derived from the unique code is used.

Figure 19:
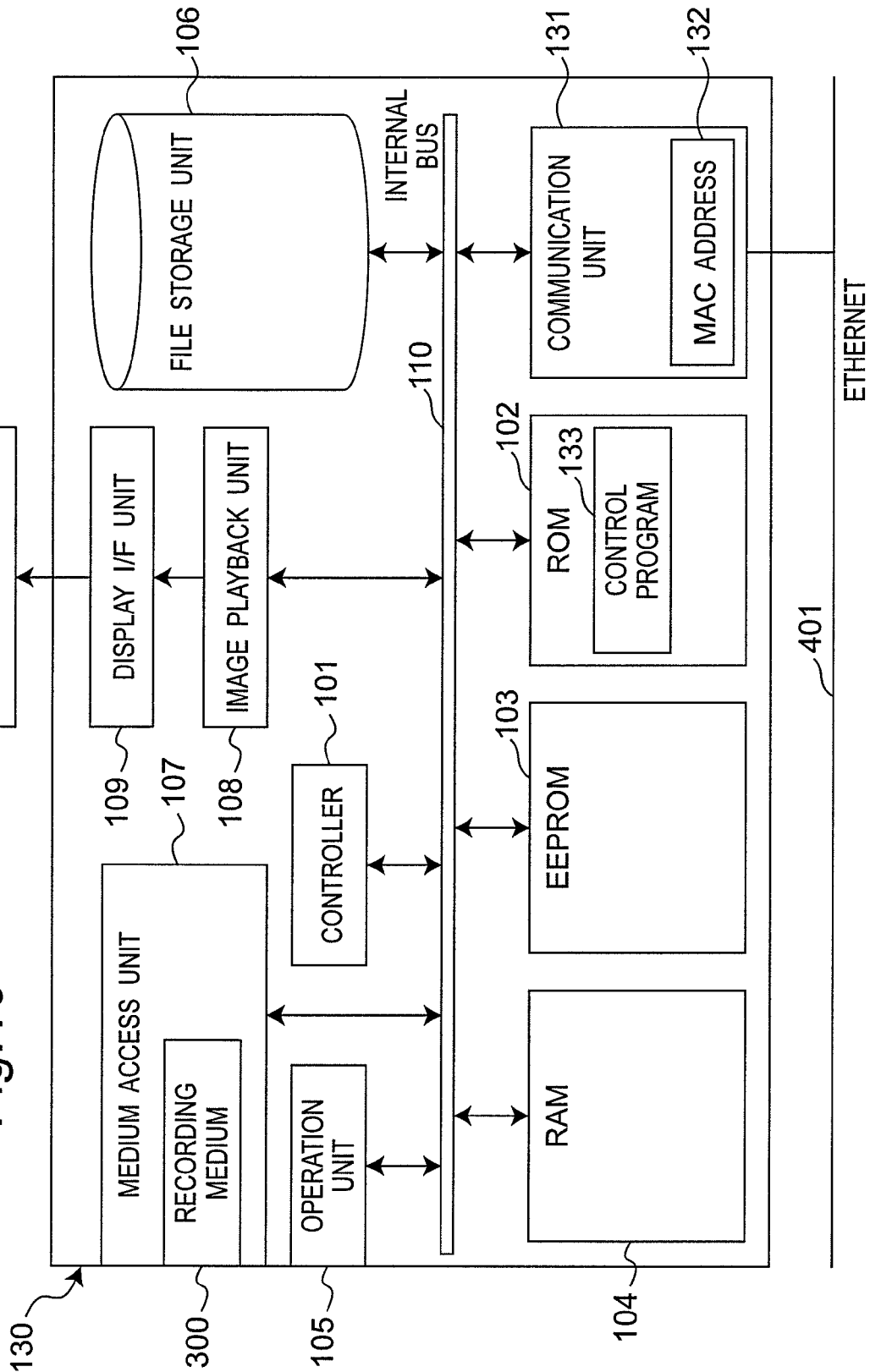
FIG. 19 is a block diagram showing a configuration of a file recording device of a third embodiment of the present invention.

FIG. 19 is a block diagram showing a configuration of a third embodiment of a file recording device of the present invention. In a file recording device 130 shown in FIG. 19, components having the same functions and configurations as those of the file recording device 120 of the second embodiment shown in FIG. 14 are denoted by the same reference numerals.

The file recording device 130 of the present embodiment further includes a communicating unit 131, such as a network card, that performs communication with Ethernet 401. The communicating unit 131 stores a uniquely assigned MAC address 132 which is an identifier for the communicating unit 131. In the file recording device 130 of the present embodiment, a device ID 122 does not particularly need to be stored in an EEPROM 103.

In addition, in a filename of a batch differential copy management file, a control program 133 of the present embodiment identifies the filename of the batch differential copy management file, using the MAC address 132 stored in the communicating unit 131 instead of a device ID, and performs a data read/write/update process on the batch differential copy management file.

Unlike a device ID, the MAC address 132 is pre-installed in the communicating unit 131 and thus a process for storing the MAC address 132 does not need to be performed upon manufacturing the file recording device 130. Note that the MAC address is a world-wide unique ID code with 6 bytes and is generally used as an identifier for a network card.

Figure 20:
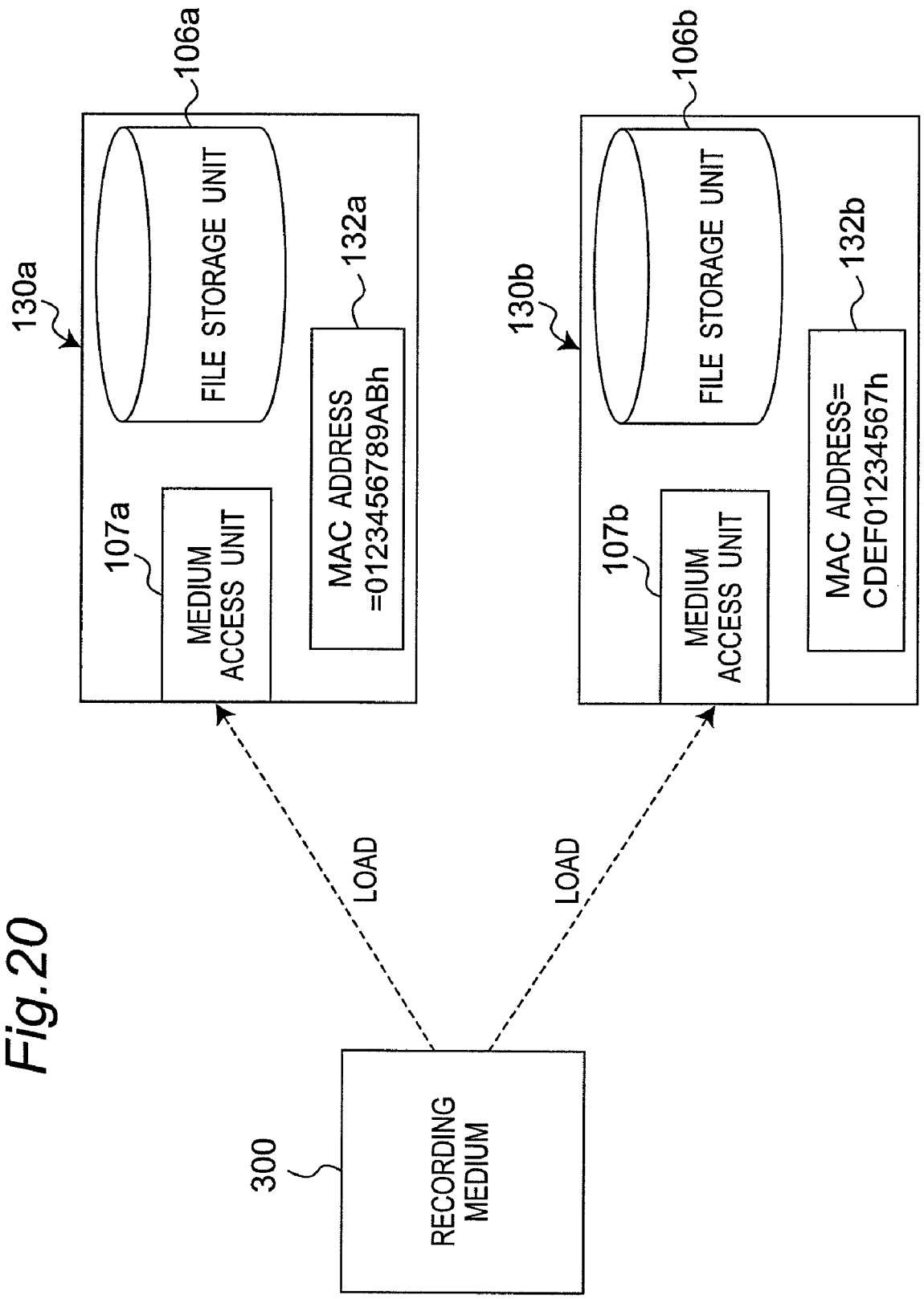
FIG. 20 is a diagram describing a concept of a medium batch differential copy by two file recording devices in the second embodiment.

FIG. 20 is a diagram explaining a concept of a medium batch differential copy by two file recording devices 130a and 130b. The file recording device 130a has a MAC address 132a with the value "0123456789AB (hexadecimal notation)" and the file recording device 130b has a MAC address 132b with the value "CDEF01234567 (hexadecimal notation)".

Here, a filename of a batch differential copy management file in the present embodiment is a combination of the character string "Store_manage_" and a "character string obtained by converting a MAC address 132 of a device to character codes". For example, when the MAC address is "0123456789AB", the character string "0123456789AB" obtained by converting hexadecimal value of "0123456789AB" to ASCII codes is used as a filename. In this case, a filename of a batch differential copy management file is "Store_manage_0123456789AB".

Note that storage rules for a batch differential copy management file in the present embodiment are the same as those in the second embodiment.

Figure 21:
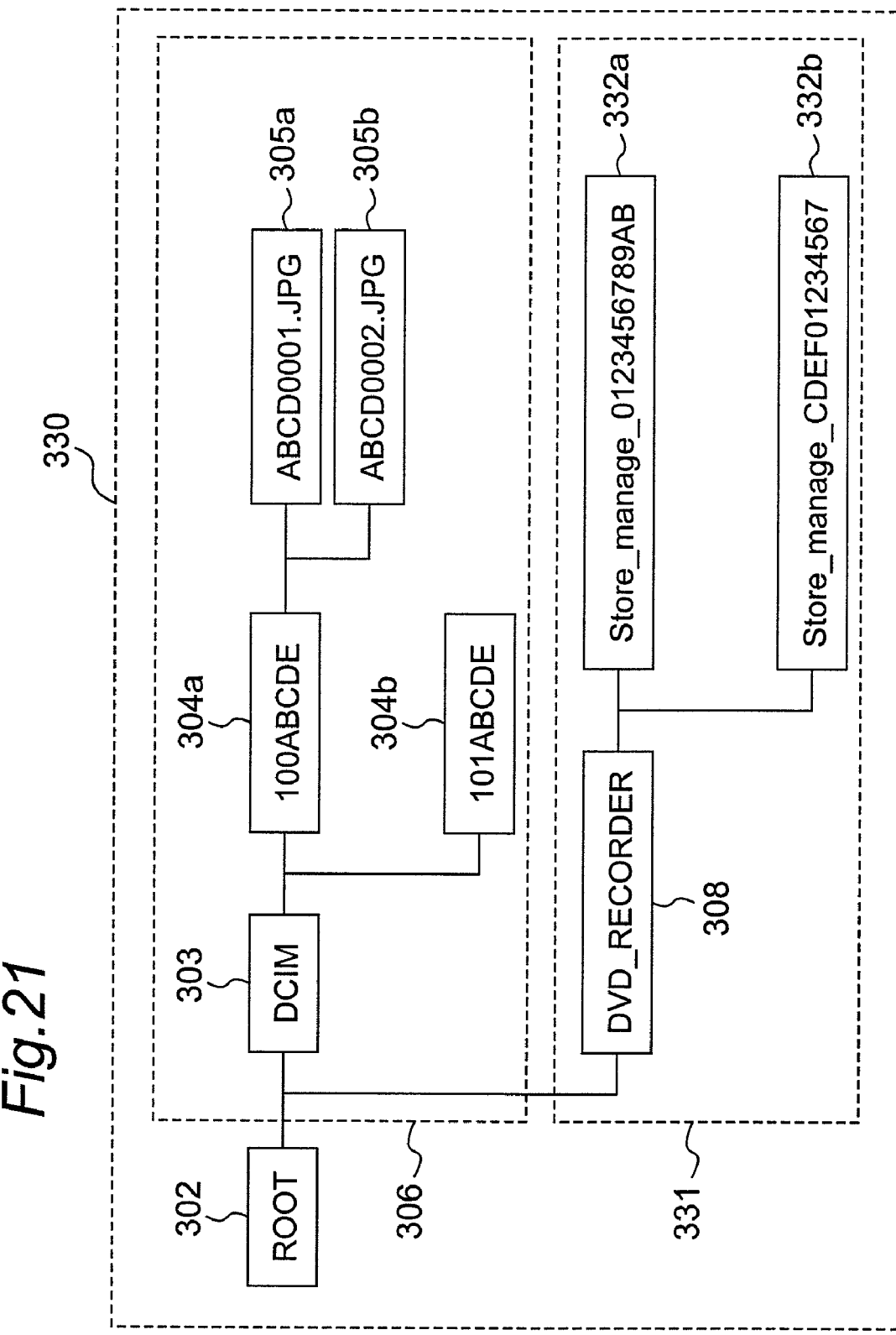
FIG. 21 is a diagram showing a folder/file configuration after a medium batch differential copy done in a recording medium by the two file recording devices.

FIG. 21 is a diagram showing a folder/file configuration after a medium batch differential copy is performed in the recording medium 300 by the file recording devices 130a and 130b. A "Store_manage_0123456789AB" file 332a which is a batch differential copy management file for the file recording device 130a and a "Store_manage_CDEF01234567" file 332b which is a batch differential copy management file for the file recording device 130b are created.

Note that a medium batch differential copy in the present embodiment is the same as that in the second embodiment except that a naming rule for a filename of a batch differential copy management file is different.

Although in the present embodiment, instead of a device ID, a MAC address which is an identifier for a network card stored in the communicating unit 131 is used as a filename of a batch differential copy management file, a network object identifier having world-wide uniqueness like a MAC address may be used by, for example, incorporating a MAC address into part of numerical values. As a network object identifier, there is a UUID (Universally Unique IDentifier) defined by DCE (Distributed Computing Environment) standard of the OSF (Open Software Foundation).

Note that although in the present embodiment a unique code included in the communicating unit 131 is directly included in a batch differential copy management file, the unique code may be encoded and then included in a batch differential copy management file.

Fourth Embodiment

The aforementioned embodiments describe an example (medium batch differential copy) in which a differential copy is performed on all files in the recording medium 300. In the present embodiment, an example will be described in which a differential copy is performed on only those files stored in a designated folder. Hereinafter, such a batch differential copy performed on a folder-by-folder basis is referred to as a "folder batch differential copy".

Figure 22:
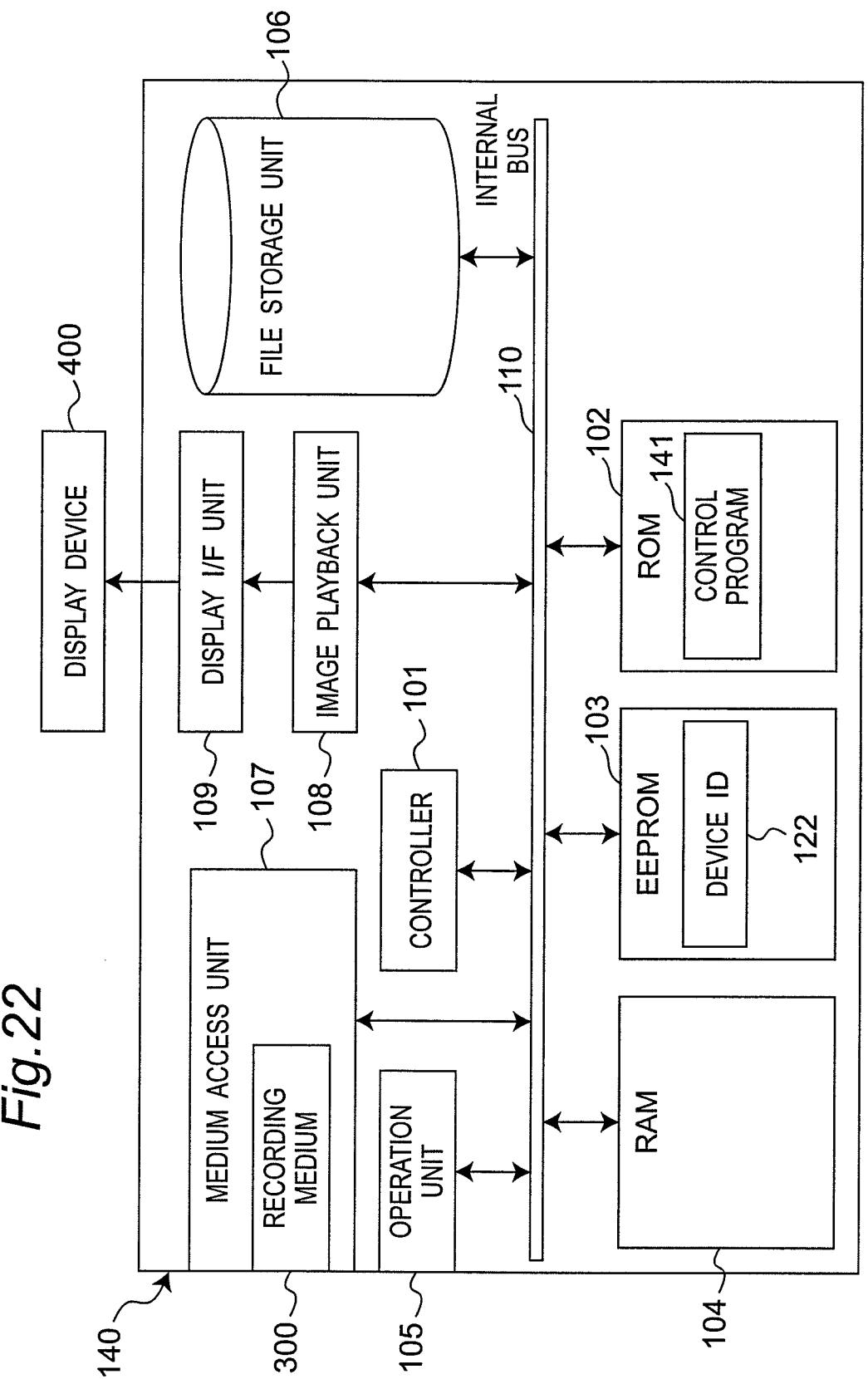
FIG. 22 is a block diagram showing a configuration of a file recording device of a fourth embodiment of the present invention.

FIG. 22 is a block diagram showing a configuration of a fourth embodiment of a file recording device of the present invention. In a file recording device 140 shown in FIG. 22, components having the same functions as those of the file recording device 120 shown in FIG. 14 are denoted by the same reference numerals.

The control program 141 of the file recording device 140 of the present embodiment implements a function of a folder batch differential copy process in addition to a function of a medium batch differential copy process to be performed by the control program 121 in the second embodiment. Note that the control program 141 may implement only the function of the folder batch differential copy process. The file recording device 140 has "00001" as a device ID 122.

Figure 23:
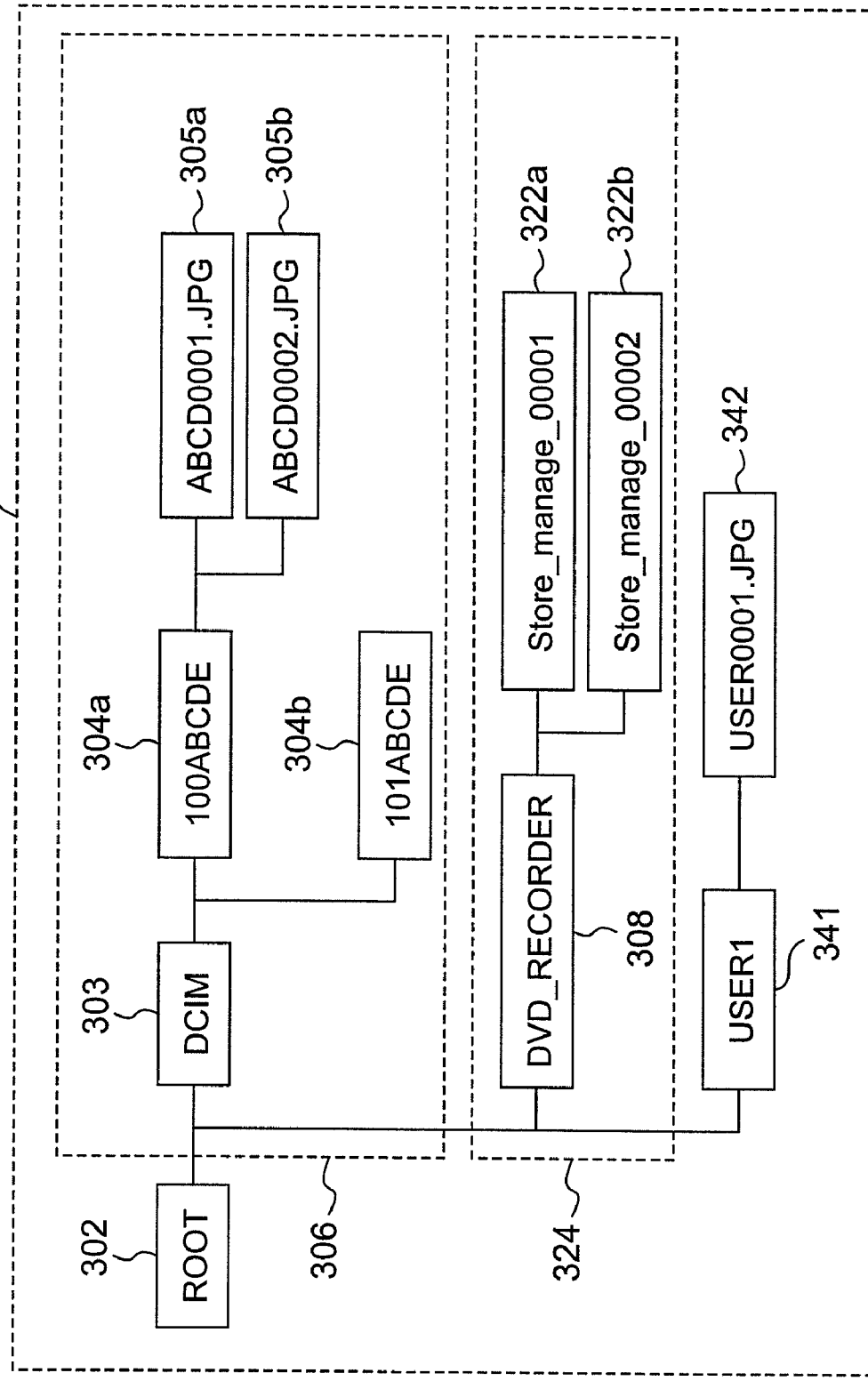
FIG. 23 is a folder/file configuration before a folder batch differential copy done by the file recording device of the fourth embodiment.

FIG. 23 shows a folder/file configuration before a folder batch differential copy by the file recording device 140 of the present embodiment is performed. In a folder/file configuration 340 shown in the drawing, there are a USER1 folder 341 and an image file 342 stored in the USER1 folder 341 in addition to a DCIM folder 303 and a DVD_RECORDER folder 308. Here, the USER1 folder 341 is a target folder for a batch differential copy on a folder-by-folder basis.

Note that a filename of a target folder for a folder batch differential copy can be set to any filename as long as the filename is different from those of the top folder 303 and the batch differential copy management file storage folder 308 under an image file storage folder tree 306. In the present embodiment, it is named "USER1".

Figure 24:
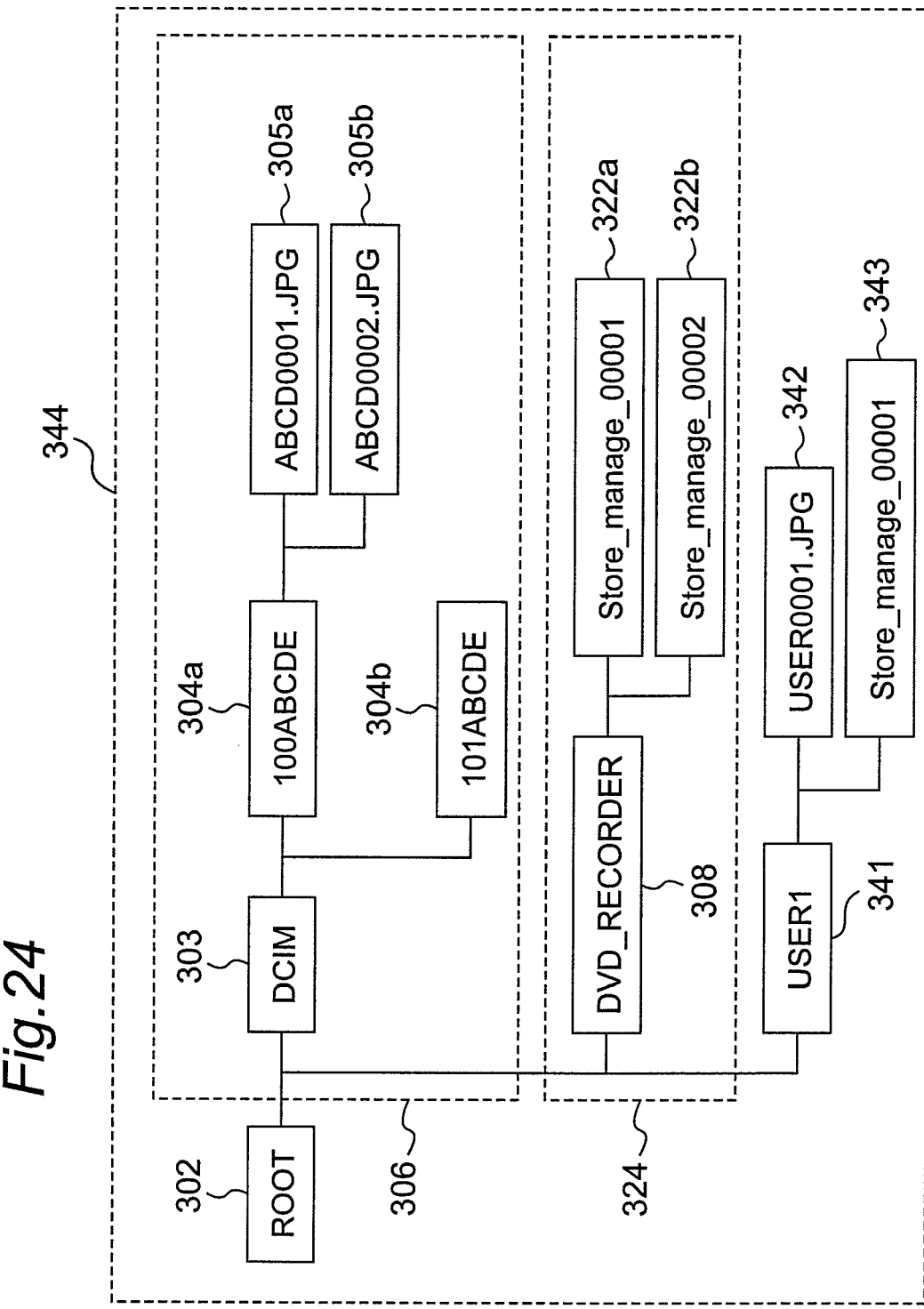
FIG. 24 is a diagram showing a folder/file configuration after a folder batch differential copy done by the file recording device of the fourth embodiment.

FIG. 24 shows a folder/file configuration after a folder batch differential copy is performed by the file recording device 140. A folder batch differential copy management file 343 is added to the folder/file configuration shown in FIG. 23. The folder batch differential copy management file 343 contains copy completion date and time data having the same format as that of the medium batch differential copy completion data and time data. Also, a naming rule for a filename of the folder batch differential copy management file 343 is the same as that in the second embodiment. Since in the example of FIG. 24 the folder batch differential copy is performed by the file recording device 140 with the device ID "00001", a filename of the folder batch differential copy management file 343 is "Store_manage_00001". The file recording device 140 records the completion time of a folder batch copy performed on the USER1 folder as folder batch differential copy completion time data. Note that there is no problem even if the naming rule for the filename of the folder batch differential copy management file 343 is made different from that in the second embodiment.

Figure 25:
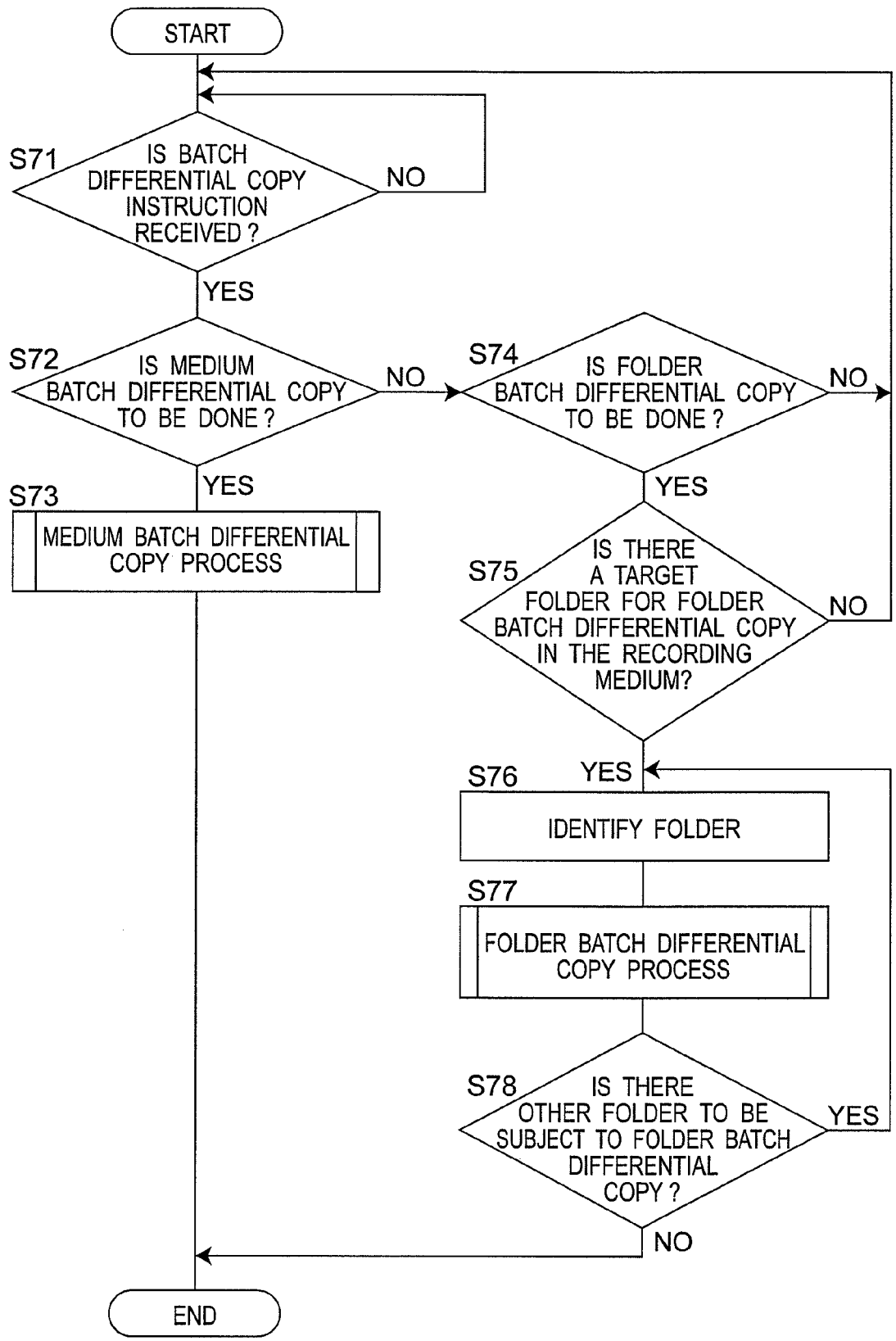
FIG. 25 is a flowchart of an overall batch differential copy process of the file recording device of the fourth embodiment.
Figure 26:
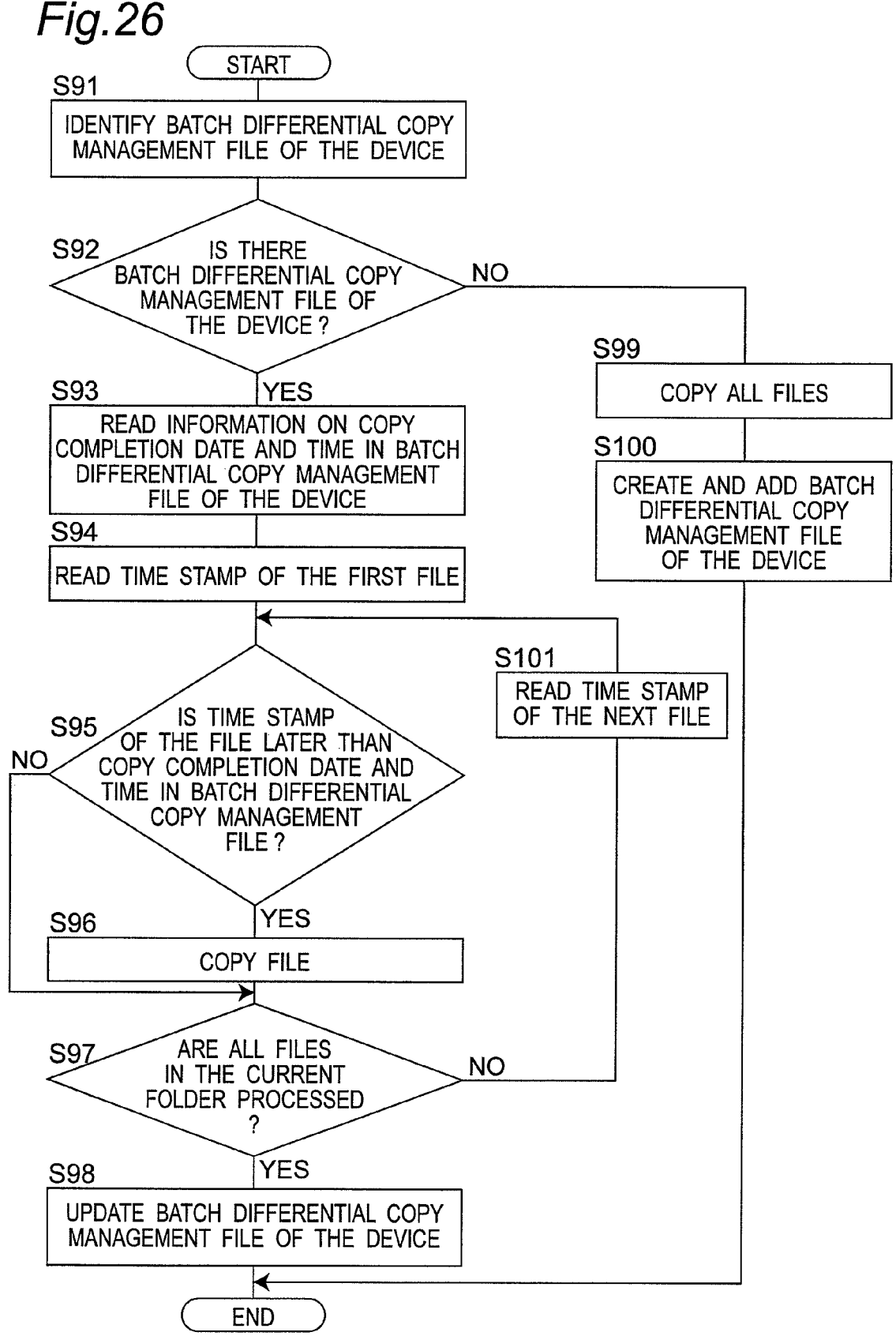
FIG. 26 is a flowchart of a folder batch differential copy process.

FIG. 25 is a flowchart showing an overall batch differential copy process of the present embodiment. FIG. 26 is a flowchart showing a folder batch differential copy process.

First, the overall batch differential copy process in the file recording device 140 will be described. Storage/naming rules for the batch differential copy management file in the present embodiment are the same as those in the second embodiment.

Note that in the present embodiment the medium batch differential copy is done for the DCIM folder or folders under the DCIM folder. The folder batch differential copy is done for all folders other than the DCIM folder, the folders under the DCIM folder, and the DVD_RECORDER folder which is the batch differential copy management file storage folder 308.

When a recording medium 300 having the folder/file configuration 340 shown in FIG. 23 is inserted into the medium access unit 107, the file recording device 140 detects the medium insertion and starts a copy process. The copy process will be described below with reference to the flowchart in FIG. 25.

In FIG. 25, when the control unit 101 of the file recording device 100 receives a batch differential copy instruction, if the batch differential copy instruction indicates a "medium batch differential copy" (S72), a batch differential copy process is performed (S73). Specific process of the medium batch differential copy is as described above and thus a detailed description thereof is omitted here. Note that the batch differential copy instruction is, for example, issued based on an operation on the operation unit 105 by a user, or issued by the medium access unit 107 detecting insertion of the recording medium 300.

On the other hand, if the batch differential copy instruction indicates a "folder batch differential copy" (S74), the control unit 101 checks whether there are folders that can be targets for the batch differential copy, i.e., there are the other folders than the DCIM folder, folders under the DCIM folder, and the DVD_RECORDER folder (S75), in the folders of the recording medium 300. If there is no folder that can be a target for the batch differential copy, the control unit 101 waits for a further batch differential copy instruction. In the example of FIG. 24, there is a USER1 folder 341 other than "the DCIM folder, folders under the DCIM folder, and the DVD_RECORDER folder". Thus it is determined that there is a folder that can be a target for the batch differential copy.

If there is a folder that can be a target for the batch differential copy, the control unit 101 identifies a folder on which the batch differential copy is to be performed, based on designation by the user (S76). The target folder for the batch differential copy can be designated by the user through the operation unit 105.

The folder batch differential copy process is performed on one designated folder (S77). The folder batch differential copy process is described in detail later. After completion of the folder batch differential copy process on the one designated folder, it is determined whether in the designated folders there are still other folders on which the folder batch differential copy process has not been performed (S78) and the above-described process is repeated until the folder batch differential copy process is performed on all folders of the designated folders (S76 to S78).

<Folder Batch Differential Copy>

The folder batch differential copy process (S77) is described in detail with reference to the flowchart in FIG. 26. A batch differential copy management file to be referred to upon time stamp check for the folder batch differential copy is stored in a target folder for a folder batch differential copy.

First, a filename of the batch differential copy management file for the file recording device 140 that performs a copy is identified (S91). As described above, the device ID 122 of the file recording device 140 is "00001" and thus the batch copy management file is named "Store_manage_00001" under the designated folder which is a copy source.

Subsequently, it is determined whether the identified batch differential copy management file is in the designated folder in the recording medium 300 (S92). If the identified batch differential copy management file is not in the designated folder in the recording medium 300, all files in the designated folder are copied to the file storage unit 106 (S99). In an example of FIG. 23, since there is no "Store_manage_00001" file under the USER1 folder 341, an image file 342 stored in the USER1 folder 341 is unconditionally copied to the file storage unit 106 (S99)

After completion of the copy, a batch differential copy management file is created in the folder on which the folder batch differential copy is performed, and then is updated with copy completion date and time written therein (S100). In the example of FIG. 23, a "Store_manage_00001" file is created under the USER1 folder 341 and then is updated with copy completion date and time written therein. The folder/file configuration is changed, by the folder batch copy process, from the configuration 340 shown in FIG. 23 to the configuration 344 shown in FIG. 24.

On the other hand, if the identified batch differential copy management file is in the designated folder in the recording medium 300, the copy completion date and time information in the batch differential copy management file is read out (S93). Subsequently, a time stamp of the first file in the designated folder in the recording medium 300 is read out (S94). Then, the copy completion date and time indicated by the batch differential copy management file is compared with the time stamp of the file (S95).

If the recording date and time indicated by the time stamp of the file is later than the copy completion date and time, the file is copied to the file storage unit 106 of the file recording device 140 (S96). On the other hand, if the recording date and time indicated by the time stamp of the file is equal to or earlier than the copy completion date and time, the file is not copied because it can be determined that the file is one that has already been copied to the file recording device 140.

It is determined whether all files in the designated folder have been processed (S97) and if there still remain files that should be processed, a time stamp of the next file is read out (S101) and the above-described process is repeated (S95 to S97).

When all files in the designated folder have been processed, the batch differential copy management file corresponding to the file recording device 140 and associated with the designated folder is updated (S98) and the process ends.

In the present embodiment, the copy completion date and time of a file under a target folder for the folder batch differential copy is stored and referred to, as a file (hereinafter, referred to as a "folder batch differential copy management file") independent of a batch differential copy management file (hereinafter, referred to as a "medium batch differential copy management file") for the medium batch differential copy. This configuration provides an advantageous effect in that dubbing can be performed again to the file recording device as long as a file which is created or updated earlier than the medium batch differential copy completion time is stored in a target folder for the folder batch differential copy.

Note that although in the present embodiment the USER1 folder is a target for the folder batch differential copy, an image file put under the ROOT directory may be a target for the folder batch differential copy.

Note that in the present embodiment a medium batch differential copy and a naming rule may be the same as those in the first or third embodiment.

Note also that in the present embodiment folder batch differential copy completion date and time data is stored in a designated folder which is a copy source, but may be stored in a folder under the designated folder which is the copy source. Alternatively, a folder batch differential copy management file may be stored in the same folder as the one in which a medium batch differential copy management file is stored. In this case, a filename of the folder batch differential copy management file needs to be named the different name from that of the medium batch differential copy management file. For example, the filename may be named "Store_manage_user".

Note also that in the present embodiment the format of the folder batch differential copy management file is the same as that of file/time stamp information in file management information in the recording medium 300. However the format of the folder batch differential copy management file may be the same as that of time stamp information to be written in an image information storage area of an image file. In this case, a time stamp check may be performed using time stamp information read from a time stamp field of an image information storage area of an image file which is a candidate for a copy.

Note also that in the present embodiment a type of file to be copied may be designated. For example, only a file having a filename containing character string designated by a user or a file having a designated extension may be a copy target.

Variations (1) The first to fourth embodiments show the case in which in the file management information there is only one piece of date and time information which is used as time stamp in the time stamp check, for each file. When there are plural pieces of date and time information for one file, the latest time information among the pieces of date and time information may be used as time stamp.

Figure 27:
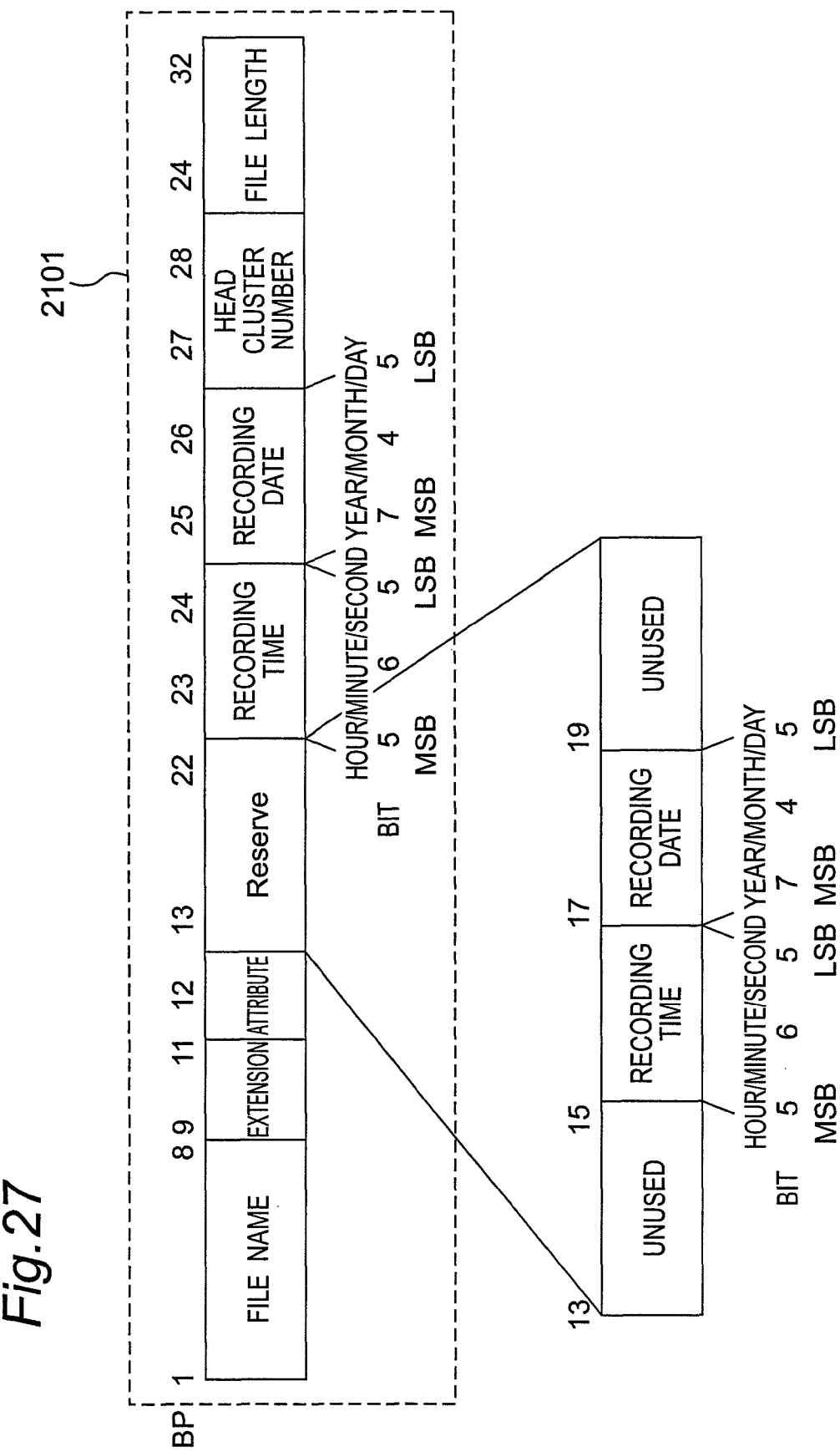
FIG. 27 is a diagram showing another example of the format of a directory item which is file management information.

(2) FIG. 27 shows an example of a format for the case in which in file management information there are two types of date and time information for one file. FIG. 27 shows a configuration of a directory item 2101 which is file management information in a FAT16 file system or a FAT32 file system. In FIG. 27, unlike the format shown in FIG. 5, a part of the reserved area (BP13 to BP22) which is undefined area in the standard is used as a file date and time information field (BP15 to BP18).

By referring to the two types of date and time information, two kinds of date and time, "creation date and time" and "update date and time", can be handled. Here, some apparatuses for writing a file in a recording medium 300 may handle the above-described two kinds of date and time information fields differently. One apparatus may handle the date and time on which a file is copied to the recording medium 300 as "creation date and time", while the other apparatus may handle them as "update date and time". In addition, one apparatus may write "creation date and time" in a file time information field (BP23 to BP26) which is defined by the standard, while the other apparatus may write them in a part of the Reserve area as the file time information field (BP15 to BP18). In either case, the last date and time on which any operation such as editing is performed on a file is the newer one of the two pieces of date and time information. Thus a differential copy can be performed without omission by using the newer one as a time stamp of the file in a time stamp check. The same applies to the case in which there are three or more pieces of time information for each file.

(3) In the first to fourth embodiments, an image file may be JPEG file according to Exif (Exchangeable Image File Format), and a format of copy completion date and time data in the medium batch differential copy management file and the folder batch differential copy management file may be the same as that of recording date and time information field defined in Exif. In this case, a time stamp check is performed by comparing the copy completion date and time of the copy management file with the recording date and time information according to Exif for a JPEG file which is a candidate for a copy. The Exif recording date and time information is not changed even when editing such as image rotation or resizing is performed on a JPEG file. Thus, even when editing is performed, a differential copy can be properly implemented.

(4) In the first to third embodiments, image files which are targets for the medium batch differential copy are limited to image files in a target folder for the medium batch differential copy. However, all image files in the recording medium may be targets for the medium batch differential copy.

(5) In the first to third embodiments, all files under a folder which is not a target for the medium batch differential copy may be copied to the file recording device after the medium batch differential copy is performed.

(6) In the first to fourth embodiments, the targets for the medium batch differential copy or the folder batch differential copy are image files (still images), but may be moving images or texts. There are no restrictions on types of files to be copied.

(7) In the first to fourth embodiments the batch differential copy management file storage folder is provided and the batch differential copy management file is stored under the batch differential copy management file storage folder. However, without providing the batch differential copy management file storage folder, the batch differential copy management file may be stored under the ROOT folder.

(8) In the first to fourth embodiments, a copy target registration list file may be stored in advance in a recording medium which is a copy source, and the batch differential copy may be performed only those files registered in the copy target registration list file. The file recording device reads the copy target registration list file before the batch differential copy, and performs the batch differential copy on only those files registered therein. The copy target registration list file includes AUTPLAY.MRK or AUIXFER.MRK which are defined by DPOF (Digital Print Order Format) standard.

(9) In the first to fourth embodiments, the batch differential copy may be performed on only those files of which information written in a file information storage area of the files satisfies a predetermined condition. Before the time stamp check in the batch differential copy, the file recording device may check, for each file, whether information written in the file information storage area satisfies the predetermined condition, and perform the differential copy on only those files that satisfy the predetermined condition. As the "information written in a file information storage area", Exif information can be used.

(10) Although in the first to fourth embodiments a hard disk is used as the file storage unit of the file recording device, the file storage unit may be a rewritable optical disk such as a DVD-RAM.

(11) In the first to fourth embodiments, information indicating time and date, such as file creation date and time and copy completion date and time, is used in the time stamp check. Instead of such information, file serial numbers which are consecutively provided to files may be used. The file serial number is a number which is provided upon file creation to a file by an apparatus that writes files in a recording medium by incrementing the number for each file. Chronological relationship can be grasped by comparison of file serial numbers. Thus, it can be determined whether a copy is done or not by the following steps. When the batch differential copy is completed, the highest file serial number among file serial numbers of all copied files is stored in the copy management file. In a subsequent time stamp check, the file serial number stored in the copy management file is compared with a file serial number of a copy target file.

More specifically, upon the batch differential copy, the file recording device reads a file serial number of a copy target file from the file management information, and writes the highest file serial number among file serial numbers of copied files to the "medium (folder) batch differential copy management file". Thereafter, upon performing a medium (folder) batch differential copy, the file recording device reads the file serial number from the "medium (folder) batch differential copy management file", and copies only those files having higher file serial numbers than the read file serial number.

(12) The latest date and time among dates and times indicated by date and time information on all files which are copied from the recording medium 300 to the data storage unit 106 of the file recording device may be used as copy management date and time information in the batch differential copy management file. This is because even when there is a difference in time of timer between the file input device 50 and the file recording device 100, an influence caused thereby can be eliminated, enabling more accurate time stamp check.

(13) A batch differential copy management file may be recorded in a file system. This configuration can prevent a batch differential copy management file from being deleted or corrupted due to a general user's misoperation.

INDUSTRIAL APPLICABILITY

The present invention can be applied to a device that performs a copy from a first recording medium string image data to a second recording medium. For example, the present invention can be applied to a batch copy of image files from a memory card storing image files shot with a digital camera to a mass recording medium such as a hard disk built in a DVD recorder. Also, the present invention can be applied to the case, for example, of performing a copy from a built-in memory in a digital camera or a mobile phone terminal with a camera to a memory card.

The invention claimed is:

1. A file recording device comprising:
a medium access unit adapted to load a removable first recording medium;
a second recording medium that stores a file; and
a control unit that controls a batch copy process which copies collectively a plurality of files stored in the first recording medium from the first recording medium to the second recording medium, wherein
the first recording medium stores, for each file, recording date and time information for identifying recording date and time of the file,
when the batch copy process from the first recording medium to the second recording medium is completed, the control unit records copy date and time identification information for identifying completion date and time of the batch copy process to the first recording medium, the copy date and time identification information being one piece of information provided for the plurality of files copied in the batch copy process and provided independently of the files stored in the first recording medium, and
the control unit further controls the batch copy process so as to compare the completion date and time of the batch copy process indicated by the copy date and time identification information with recording date and time information on files stored in the first recording medium, to identify a file which is recorded in the first recording medium later than the date and time on which the batch copy is performed, and to copy the identified file from the first recording medium to the second recording medium.

2. The file recording device according to claim 1, wherein the control unit controls the batch copy process so as to copy all files stored in the first recording medium from the first recording medium to the second recording medium when the copy date and time identification information is not recorded in the first recording medium.

3. The file recording device according to claim 1, wherein
the first recording medium is accessible by a plurality of file recording devices,
the control unit records the copy date and time identification information to the first recording medium, while relating the copy date and time identification information to the file recording device that includes the control unit, and
the control unit:
identifies copy date and time identification information related to the file recording device, with information unique to the file recording device that includes the control unit, and
controls the batch copy process from the first recording medium to the second recording medium based on the identified copy date and time identification information.

4. The file recording device according to claim 3, wherein the information unique to the file recording device is a manufacturing number of the file recording device.

5. The file recording device according to claim 3 further comprising a communication unit that is assigned a unique code which is unique on a network, wherein
the information unique to the file recording device is the unique code assigned to the communication unit or a code derived from the unique code.

6. The file recording device according to claim 1, wherein the control unit treats all files stored in the first recording medium, as target for copy from the first recording medium to the second recording medium.

7. The file recording device according to claim 1, wherein the control unit treats only files stored in a folder designated by a user, as target for copy from the first recording medium to the second recording medium.

8. The file recording device according to claim 1, wherein the control unit treats only files that satisfy a condition designated by a user, as target for copy from the first recording medium to the second recording medium.

9. The file recording device according to claim 1, wherein
when the first recording medium stores a plurality of pieces of the recording date and time information, the control unit compares the completion date and time of the batch copy process indicated by the copy date and time identification information, with a latest one among dates and times indicated by the plurality of pieces of the recording date and time information.

10. The file recording device according to claim 1, wherein the control unit records, as the copy date and time identification information, the latest date and time among dates and times indicated by recording date and time information on all files copied from the first recording medium to the second recording medium, to the first recording medium.

11. The file recording device according to claim 1, wherein the recording date and time information and the copy date and time identification information include information by which chronological relationship between date and time on which a file in the first recording medium is recorded to the first recording medium and date and time on which the batch copy is completed can be identified.

12. An imaging device for recording an image file to a removable first recording medium, comprising a controller that controls an operation of the imaging device, wherein
the first recording medium stores recording date and time information indicating recording date and time of a stored file for each file, and copy date and time identification information for identifying date and time on which a batch copy of a file or files from the first recording medium to a second recording medium is completed, the copy date and time identification information being one piece of information provided for the plurality of files copied in the batch copy process and provided independently of the files stored in the first recording medium, and
the controller performs control so as to compare, in the first recording medium, date and time indicated by the copy date and time identification information with recording date and time information on a file in the first recording medium, to determine whether the file is copied to the second recording medium, and to store information indicating a result of the determination to a predetermined storage area.

* * * * *